(12) United States Patent
Chen et al.

(10) Patent No.: US 12,645,120 B2
(45) Date of Patent: Jun. 2, 2026

(54) DISPLAY PANEL AND DISPLAY APPARATUS

(71) Applicants: Chongqing BOE Optoelectronics Technology Co., Ltd., Chongqing (CN); BOE Technology Group Co., Ltd., Beijing (CN)

(72) Inventors: Junming Chen, Beijing (CN); Xiaoyuan Wang, Beijing (CN); Hui Guo, Beijing (CN); Chen Xu, Beijing (CN); Bin Wan, Beijing (CN); Guodong Yang, Beijing (CN); Yan Liu, Beijing (CN); Xun Pu, Beijing (CN); Jiandong Guo, Beijing (CN); Zhongshan Wu, Beijing (CN); Yuanyuan Zhu, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 82 days.

(21) Appl. No.: 18/701,302

(22) PCT Filed: Nov. 21, 2022

(86) PCT No.: PCT/CN2022/133314
§ 371 (c)(1),
(2) Date: Apr. 15, 2024

(87) PCT Pub. No.: WO2024/108351
PCT Pub. Date: May 30, 2024

(65) Prior Publication Data
US 2025/0258411 A1　Aug. 14, 2025

(51) Int. Cl.
*G02F 1/1362* (2006.01)
*G02F 1/1339* (2006.01)

(52) U.S. Cl.
CPC .... *G02F 1/136286* (2013.01); *G02F 1/13394* (2013.01); *G02F 1/136209* (2013.01); *G02F 1/136227* (2013.01)

(58) Field of Classification Search
CPC .................................................. G02F 1/13394
See application file for complete search history.

(56) References Cited

U.S. PATENT DOCUMENTS

| | | | |
|---|---|---|---|
| 2012/0107978 A1 | 5/2012 | Shin et al. | |
| 2013/0300991 A1 | 11/2013 | Lim | |
| 2015/0185566 A1* | 7/2015 | Choi | G02F 1/1368 |
| | | | 438/30 |

FOREIGN PATENT DOCUMENTS

| | | | | |
|---|---|---|---|---|
| CN | 101216641 A | * | 7/2008 | G02F 1/13394 |
| CN | 105045425 A | | 11/2015 | |

(Continued)

*Primary Examiner* — Mariceli Santiago
(74) *Attorney, Agent, or Firm* — ArentFox Schiff LLP; Michael Fainberg

(57) ABSTRACT

Disclosed are a display panel and a display apparatus, including: a first base substrate, a second base substrate, a plurality of spacers. The first base substrate is provided with a plurality of pixel units, each of the plurality of pixel units includes a plurality of sub-pixels, and each of the plurality of sub-pixels is correspondingly provided with the common electrode via hole and the pixel via hole; the plurality of sub-pixels include a first sub-pixel and a second sub-pixel adjacent to each other along a first direction; where, in the first direction, an orthographic projection of at least one of the plurality of spacers on the first base substrate is between an orthographic projection of the common electrode via hole corresponding to the first sub-pixel on the first base substrate and an orthographic projection of the pixel via hole corresponding to the second sub-pixel on the first base substrate.

20 Claims, 28 Drawing Sheets

(56) References Cited

FOREIGN PATENT DOCUMENTS

| CN | 105353567 | A | | 2/2016 | | |
| CN | 106154650 | A | | 11/2016 | | |
| CN | 106773221 | A | | 5/2017 | | |
| CN | 106773360 | A | | 5/2017 | | |
| CN | 206975366 | U | | 2/2018 | | |
| CN | 110221483 | A | | 9/2019 | | |
| CN | 111258128 | A | | 6/2020 | | |
| CN | 111338131 | A | | 6/2020 | | |
| CN | 111458912 | A | * | 7/2020 | ....... | G02F 1/133512 |
| CN | 212846287 | U | * | 3/2021 | ......... | G02F 1/13394 |
| CN | 213457594 | U | | 6/2021 | | |
| CN | 113314032 | A | | 8/2021 | | |
| CN | 214151324 | U | | 9/2021 | | |
| CN | 215954036 | U | | 3/2022 | | |
| CN | 114296282 | A | | 4/2022 | | |
| CN | 115236902 | A | | 10/2022 | | |
| KR | 20160141143 | A | * | 12/2016 | ....... | G02F 1/136227 |

* cited by examiner

GL

VCOML

Tg

GL

152

152

1

DISPLAY PANEL AND DISPLAY APPARATUS

CROSS-REFERENCE TO RELATED APPLICATIONS

The application is a National Stage of International Application No. PCT/CN2022/133314, filed Nov. 21, 2022, which is hereby incorporated by reference in its entirety.

TECHNICAL FIELD

The present disclosure relates to the field of display technology, and in particular to a display panel and a display apparatus.

BACKGROUND

Generally, a display panel includes a plurality of pixel units. Each pixel unit may include: a plurality of sub-pixels of different colors. By controlling the brightness of sub-pixels, the desired colors are mixed to display color images.

SUMMARY

Embodiments of the present disclosure provide a display panel including:

a first base substrate, including: common voltage lines, a common electrode, a second electrode of a thin film transistor, and a pixel electrode that are located in different film layers; where the common electrode is electrically connected with one of the common voltage lines through a common electrode via hole, and the pixel electrode is connected with the second electrode of the thin film transistor through a pixel via hole;

a second base substrate opposite to the first base substrate; and a plurality of spacers between the first base substrate and the second base substrate;

where the first base substrate is provided with a plurality of pixel units, each of the plurality of pixel units includes a plurality of sub-pixels, and each of the plurality of sub-pixels is correspondingly provided with the common electrode via hole and the pixel via hole;

the plurality of sub-pixels include a first sub-pixel and a second sub-pixel adjacent to each other along a first direction; where, in the first direction, an orthographic projection of at least one spacer of the plurality of spacers on the first base substrate is between an orthographic projection of the common electrode via hole corresponding to the first sub-pixel on the first base substrate and an orthographic projection of the pixel via hole corresponding to the second sub-pixel on the first base substrate.

In some embodiments, the orthographic projection of the spacer on the first base substrate, the orthographic projection of the common electrode via hole corresponding to the first sub-pixel on the first base substrate, and the orthographic projection of the pixel via hole corresponding to the second sub-pixel that is adjacent to the first sub-pixel on the first base substrate are arranged in the first direction.

In some embodiments, a minimum spacing between a boundary of an orthographic projection of a first surface of the spacer on the first base substrate and a boundary of the orthographic projection of the common electrode via hole corresponding to the first sub-pixel on the first base substrate is a first distance; and the first surface is a surface of the spacer facing the first base substrate;

a minimum spacing between the boundary of the orthographic projection of the first surface of the spacer on the first base substrate and a boundary of the orthographic projection of the pixel via hole corresponding to the second sub-pixel on the first base substrate is a second distance; and a ratio of the first distance to the second distance ranges from 0.8 to 1.2.

In some embodiments, the first distance is greater than or equal to 1.5 um;

and/or, the second distance is greater than or equal to 1.5 um.

In some embodiments, a minimum spacing between a boundary of an orthographic projection of a second surface of the spacer on the first base substrate and the boundary of the orthographic projection of the first surface of the spacer on the first base substrate is a third distance;

the third distance ranges from 0 to 10 um; and the second surface is a surface of the spacer facing the second base substrate.

In some embodiments, a shape of an orthographic projection of a cross-section of the spacer on the first base substrate includes: a polygon, a circle, or an ellipse; and the cross-section is a cross-section at a set plane, where the set plane is parallel to the first base substrate.

In some embodiments, the display panel further includes: a black matrix between the plurality of spacers and the second base substrate; and an orthographic projection of the black matrix on the first base substrate covers an orthographic projection of each of the plurality of spacers on the first base substrate.

In some embodiments, the display panel further includes: a plurality of gate lines on the first base substrate; a row of sub-pixels is correspondingly provided with one of the plurality of gate lines and one common voltage line;

an orthographic projection of a part of the plurality of gate lines on the first base substrate has an overlapping region with an orthographic projection of a first surface and a second surface of at least one of the plurality of spacers on the first base substrate;

an orthographic projection of a part of the common voltage lines on the first base substrate has an overlapping region with an orthographic projection of the second surface of the at least one of the plurality of spacers on the first base substrate; and the orthographic projection of a part of the common voltage lines on the first base substrate does not have an overlapping region with an orthographic projection of the first surface of the at least one of the plurality of spacers on the first base substrate.

In some embodiments, the orthographic projection of the black matrix on the first base substrate further covers an orthographic projection of each of the plurality of gate lines on the first base substrate, orthographic projections of the common voltage lines on the first base substrate, and an orthographic projection of the thin film transistor on the first base substrate.

In some embodiments, for a spacer and a gate line the orthographic projections of which are overlapped with each other, a black matrix corresponding to the spacer has a convex portion along a second direction, and a width of the convex portion in the second direction is in a range of 5 um to 8 um.

In some embodiments, the plurality of spacers includes: a plurality of first spacers and a plurality of second spacers; and the plurality of first spacers have a first height in a direction perpendicular to a plane where the first base substrate is located, and the plurality of second spacers have a second height in the direction perpendicular to the plane where the first base substrate is located, where the first height is greater than the second height.

In some embodiments, the plurality of spacers are divided into a plurality of repeating units; where each of the plurality of repeating units includes a plurality of first spacers and a plurality of second spacers, and the plurality of first spacers and the plurality of second spacers in one repeating unit are uniformly distributed;

in the same repeating unit, the plurality of first spacers have a distribution period of $Z1/Zm$; where $Z1$ represents a total number of the plurality of first spacers in the repeating unit and $Zm$ represents a total number of the plurality of first spacers and the plurality of second spacers in the repeating unit; and in the same repeating unit, the plurality of second spacers have a distribution period of $Z2/Zm$; where $Z2$ represents a total number of the second spacers in the repeating unit.

In some embodiments, the plurality of sub-pixels include: a first color sub-pixel, a second color sub-pixel, and a third color sub-pixel arranged sequentially along the first direction;

the display panel further includes: a color resistance layer between the black matrix and the plurality of spacers; where the color resistance layer includes a first color resistance corresponding to the first color sub-pixel, a second color resistance corresponding to the second color sub-pixel, and a third color resistance corresponding to the third color sub-pixel; and the plurality of pixel units include two pixel units adjacent to each other along the first direction, where the two pixel units include a first pixel unit and a second pixel unit, and an orthographic projection of a first surface of a first spacer on the first base substrate is overlapped with an orthographic projection of the third color resistance corresponding to the third color sub-pixel in the first pixel unit on the first base substrate and an orthographic projection of the first color resistance corresponding to the first color sub-pixel in the second pixel unit on the first base substrate.

In some embodiments, the orthographic projection of the first surface of the first spacer on the first base substrate has a first overlapping area with the orthographic projection of the third color resistance corresponding to the third color sub-pixel in the first pixel unit on the first base substrate; and the orthographic projection of the first surface of the first spacer on the first base substrate has a second overlapping area with the orthographic projection of the first color resistance corresponding to the first color sub-pixel in the second pixel unit on the first base substrate;

where the first overlapping area is greater than or equal to the second overlapping area.

In some embodiments, the common voltage lines are in the same one layer as a gate electrode of the thin film transistor, the second electrode of the thin film transistor is on a side of the gate electrode of the thin film transistor facing away from the first base substrate, the common electrode is on a side of the second electrode of the thin film transistor facing away from the first base substrate, and the pixel electrode is on a side of the common electrode facing away from the first base substrate;

the display panel further includes: an insulating layer between the gate electrode of the thin film transistor and the second electrode of the thin film transistor, a planarization layer between the second electrode of the thin film transistor and the common voltage lines, a first passivation layer between the common electrode and the pixel electrode, a first conductive connection electrode that is in the same layer as the pixel electrode, and a second conductive connection electrode that is in the same layer as the second electrode of the thin film transistor;

the second conductive connection electrode is in contact with the common voltage line through a first via hole; where the first via hole penetrates the insulating layer; and the first conductive connection electrode is in contact with the second conductive connection electrode through a second via hole, and the first conductive connection electrode is in contact with the common electrode through a third via hole; where the common electrode via hole penetrates from a surface of the first passivation layer facing away from the first base substrate to the second conductive connection electrode and the common electrode, and the second via hole is a portion of the common electrode via hole penetrating to the second conductive connection electrode, and the third via hole is a portion of the common electrode via hole penetrating to the common electrode.

In some embodiments, an area of an orthographic projection of an active layer of the thin film transistor on the first base substrate is an active layer area;

an area of the orthographic projection of the first surface of the spacer on the first base substrate is a first surface area; and a ratio of the active layer area to the first surface area ranges from 0.2 to 1.0.

In some embodiments, an area of the orthographic projection of the first surface of the spacer on the first base substrate is a first surface area;

an area of an overlapping region of the orthographic projection of the spacer on the first base substrate and an orthographic projection of the gate of the thin film transistor on the first base substrate is a gate overlapping area; and for the spacer and the gate electrode of the thin film transistor the orthographic projections of which are overlapped with each other, a ratio of the gate overlapping area to the first surface area ranges from 0.2 to 1.0.

In some embodiments, the display panel further includes a plurality of data lines;

the orthographic projection of the spacer on the first base substrate has an overlapping region with an orthographic projection of the plurality data lines on the first base substrate;

the spacer has a first central axis along a second direction and the data line has a second central axis along the second direction; and for the spacer and the data line the orthographic projections of which are overlapped with each other, a distance between the first central axis of the spacer and the second central axis of the data line is a fourth distance; where the fourth distance is in a range of 0 to 20 um.

Embodiments of the present disclosure provide a display apparatus including the display panel as described above.

DETAILED DESCRIPTION

In order to make the objects, technical solutions and advantages of embodiments of the present disclosure clearer, the technical solutions of embodiments of the present disclosure will be described clearly and completely in the following in conjunction with the accompanying drawings of embodiments of the present disclosure. Obviously, the described embodiments are a part of embodiments of the present disclosure, and not all of embodiments. In addition, embodiments and the features in embodiments of the present disclosure can be combined with each other without conflict. Based on the described embodiments of the present disclosure, all other embodiments obtained by a person of ordinary skill in the art without the need for creative labor are within the claimed scope of the present disclosure.

Unless otherwise defined, technical or scientific terms used in the present disclosure shall have the ordinary meaning understood by a person of ordinary skill in the field to which the present disclosure belongs. The terms "first", "second", and the like as used in the present disclosure do not indicate any order, number, or significance, but are only used to distinguish different components. The words "including" or "comprising" and the like are intended to mean that the component or object preceded by the word encompasses the components or objects listed after the word and their equivalents, and does not exclude other components or objects. Words such as "connected" or "coupled" are not limited to physical or mechanical connections, but may include electrical connections, whether direct or indirect.

It should be noted that the sizes and shapes of the figures in the accompanying drawings do not reflect true proportions, but are intended to be illustrative of the invention only. And throughout the same or similar labeling denotes the same or similar elements or elements having the same or similar function.

Figure 1:
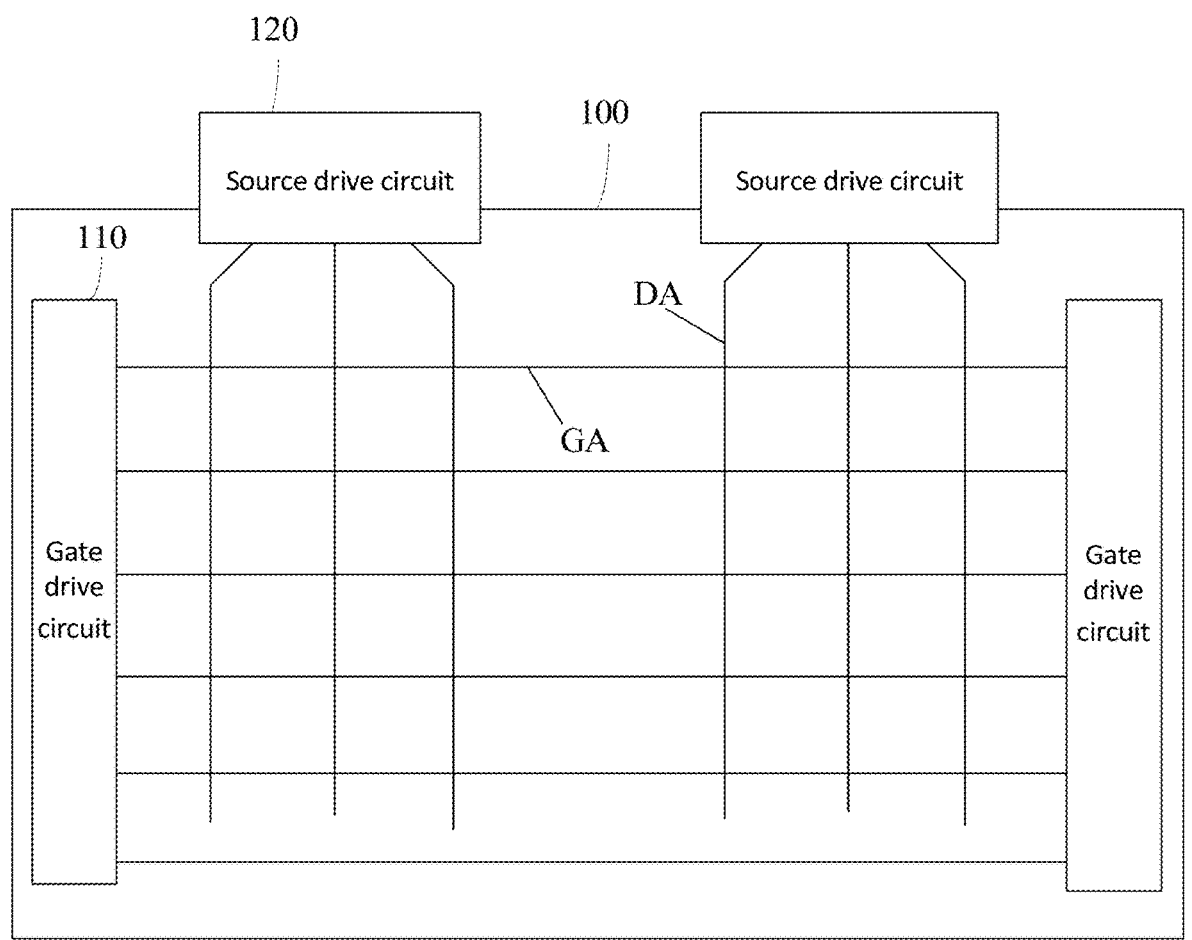
FIG. 1 shows a schematic structural diagram of a display panel in embodiments of the present disclosure.

As shown in FIG. 1, the display apparatus may include: a display panel. The display panel 100 may include an array substrate. The array substrate includes: a first base substrate provided with a plurality of pixel units arranged in an array, a plurality of gate lines GA, a plurality of data lines DA, a gate drive circuit 110, and a source drive circuit 120. The gate drive circuit 110 is coupled to each of the gate lines GA, and the source drive circuit 120 is coupled to each of the data lines DA. The gate drive circuit outputs signals to the gate lines GA so as to drive the gate lines GA. The source drive circuit 120 inputs data voltages to the data lines according to the display data so as to charge the sub-pixels SPX, so as to cause the data voltage to be corresponding input into the sub-pixels SPX to realize an image display function.

In some embodiments, the number of source drive circuits 120 may be set to 2, one of the source drive circuits 120 may be connected with half the number of data lines, and the other source drive circuit 120 may be connected with the other half of the number of data lines. Of course, in practice, the number of source drive circuits 120 may also be provided with 3, 4, or more, which may be determined according to the needs of the actual application environment, and the present disclosure is not limited thereto.

In some embodiments, each pixel unit includes a plurality of sub-pixels SPX. Each sub-pixel SPX includes a thin film transistor T and a pixel electrode 8. One row of sub-pixels SPX may correspond to one gate line, and one column of sub-pixels SPX may correspond to one data line. In some embodiments, a gate of the thin-film transistor T is electrically connected with a gate line corresponding to it, a source of the thin-film transistor T is electrically connected with a data line corresponding to it, and a drain of the thin-film transistor T is electrically connected with the pixel electrode 8, so that the pixel array structure is a single-gate structure.

In some embodiments, the display panel in the liquid crystal display apparatus may include an array substrate and an opposite substrate opposite to each other, and liquid crystal molecules encapsulated between the array substrate and the opposite substrate. Additionally, the opposite substrate may include a second base substrate and a color film on the side of the second base substrate facing the array substrate.

When an image is displayed, since there is a voltage difference between the data voltage loaded on the pixel electrode of each sub-pixel SPX and the common electrode voltage loaded on the common electrode, the voltage difference may form an electric field so that the liquid crystal molecules are deflected under the action of the electric field. The electric field of different strengths causes the liquid crystal molecules to be deflected to different degrees, which results in different transmittance rates of the sub-pixels SPX to enable the sub-pixels SPX to achieve brightness of different gray scales, and thus to realize the image display.

As shown in FIGS. 2 to 9, the display panel includes: a first base substrate 1 and a second base substrate 01 opposite to each other, at least one common voltage line VCOML, a second passivation layer 12, a common electrode 2, a first passivation layer 14, a pixel electrode 8, a second conductive connection electrode 9, a planarization layer 13, a first conductive connection electrode 10, and a plurality of spacers 15. The first base substrate 1 includes a display region 1a and a peripheral region 1b surrounding the display region 1a. The common voltage line VCOML is within the display region 1a, and each common voltage line VCOML is configured with at least one conductive connection region 5. The second passivation layer 12 is on a side of the common electrode line VCOML facing away from the first base substrate 1. The common electrode 2 is on a side of the second passivation layer 12 facing away from the first base substrate 1. The first passivation layer 14 is on a side of the common electrode 2 facing away from the first base substrate 1. The pixel electrode 8 is on a side of the first passivation layer 14 facing away from the first base substrate 1. The first conductive connection electrode 10 is disposed in the corresponding conductive connection region 5 and is in the same layer as the pixel electrode 8, and the common electrode 2 is electrically connected with the common voltage line VCOML via the first conductive connection electrode 10.

In embodiments of the present disclosure, the common voltage peripheral lead 3 is provided within the peripheral region 1b, and the common electrode 2 extends into the peripheral region 1b to be electrically connected with the common voltage peripheral lead 3 within the peripheral region 1b.

In addition, in embodiments of the present disclosure, the pixel electrode 8 is a slit electrode.

On the one hand, in embodiments of the present disclosure, the common voltage line(s) VCOML is provided within the display region 1a and each common voltage line VCOML is configured with at least one conductive connection region 5, and the common electrode 2 is electrically connected with the common voltage line VCOML via the first conductive connection electrode 10 in the conductive connection region 5. Compared to the technical solution in the related art that the common voltage signal is provided to the common electrode 2 only by using the common voltage peripheral lead 3 in the peripheral region 1b, in the display panel provided in the embodiments of the present disclosure, the common voltage signal is provided to the common electrode 2 not only by using the common voltage peripheral lead 3 in the peripheral region 1b, but also using the common voltage line VCOML in the display region 1a, so the loading speed of the common voltage signal on the common electrode 2 can be effectively increased, the delay of the common voltage signal can be reduced, and the stability of the common voltage signal can be improved.

On the other hand, in embodiments of the present disclosure, the first conductive connection electrode 10 is provided in the same layer as the pixel electrode 8, so that the first conductive connection electrode 10 and the pixel electrode 8 to be prepared based on the same one MASK process, and thus the provision of the first conductive connection electrode 10 does not lead to an increase in the number of MASK processes.

At the same time, since the common electrode 2 is electrically connected with the common voltage line VCOML through the first conductive connection electrode 10d on the side of the common electrode 2 facing away from the first base substrate 1, instead of being directly connected with the common voltage line VCOML through the via hole in the second passivation layer 12, the MASK process for preparing the second passivation layer 12 can also be performed after the MASK process or preparing the common electrode 2. That is, the MASK process for preparing the second passivation layer 12 may be the same one MASK process as the MASK process for preparing the first passivation layer 14 on the side of the common electrode 2 facing away from the first base substrate 1 (i.e., the second passivation layer 12 and the first passivation layer 14 are subjected to the MASK process at the same time), and thus the number of MASK processes may be effectively reduced.

In some embodiments, the thin film transistor T is between the first base substrate 1 and the second passivation layer 12, and the common voltage line VCOML is in the same layer as the gate electrode Tg of the thin film transistor T. That is, the common voltage line VCOML and the gate electrode Tg of the thin film transistor T can be prepared based on the same one MASK process, and thus the provision of the common voltage line VCOML does not result in an increase in the number of MASK processes.

In some embodiments, the first electrode Ts and the second electrode Td of the thin-film transistor T are on a side of the gate electrode Tg of the thin-film transistor T facing away from the first base substrate, and an insulating layer 11 is provided between the gate electrode Tg of the thin-film transistor T, and the first electrode Ts and the second electrode Td of the thin-film transistor T.

It should be noted that when the thin film transistor T is a bottom-gate thin film transistor T, the insulating layer 11 is a gate insulating layer 11 between the gate electrode Tg and the active layer Ta; and when the thin film transistor T is a top-gate thin film transistor T, the insulating layer 11 is an interlayer dielectric layer between the gate electrode Tg and the first electrode Ts and the second electrode Td. In the embodiments of the present disclosure, the thin film transistor T is a bottom-gate thin film transistor T. In the embodiments of the present disclosure, the thin-film transistor T as the bottom-gate thin film transistor T is described by example, which only plays an example role and does not limit the disclosed technical solution.

In embodiments of the present disclosure, the second conductive connection electrode 9 is in the corresponding conductive connection region 5 and is in the same layer as the first electrode Ts and the second electrode Td of the thin film transistor T. The second conductive connection electrode 9 is in contact with the common voltage line VCOML through the first via hole h1 in the insulating layer 11; and the first conductive connection electrode 10 is electrically connected with the common voltage line VCOML through the second conductive connection electrode 9.

In embodiments of the present disclosure, if the second conductive connection electrode 9 is not provided but the first conductive connection electrode 10 is directly connected with the common voltage line VCOML through the via hole, the first conductive connection electrode 10 needs to extend along the sidewall of the corresponding via hole from a surface of the first passivation layer 14 facing away from the first base substrate 1 to a surface of the common voltage line VCOML facing away from the first base substrate 1, and the first conductive connection electrode 10 as a whole will have a larger segment difference, thus a risk of fracture of the first conductive connection electrode 10 will easily occur. By providing the second conductive connection electrode 9 and electrically connecting the first conductive connection electrode 10 to the common voltage line VCOML via the second conductive connection electrode 9, the first conductive connection electrode 10 needs to extend along the sidewall of the corresponding via hole from the surface of the first passivation layer 14 facing away from the first base substrate 1 to the surface of the second conductive connection electrode 9 facing away from the first base substrate 1. In this manner, the overall segment difference of the first conductive connection electrode 10 can be effectively reduced, thereby reducing the risk of fracture of the first conductive connection electrode 10.

In some embodiments, in the conductive connection region 5, a second via hole h2 penetrates from the surface of the first passivation layer 14 facing away from the first base substrate 1 to the second conductive connection electrode 9, and a third via hole h3 penetrates from the surface of the first passivation layer 14 facing away from the first base substrate 1 to the common electrode 2 are formed. The first conductive connection electrode 10 is in contact with the corresponding second conductive connection electrode 9 through the second via hole h2. The first conductive connection electrode 10 is in contact with a portion of the common electrode 2 within the conductive connecting region 5 through the third via hole h3.

Figure 2:
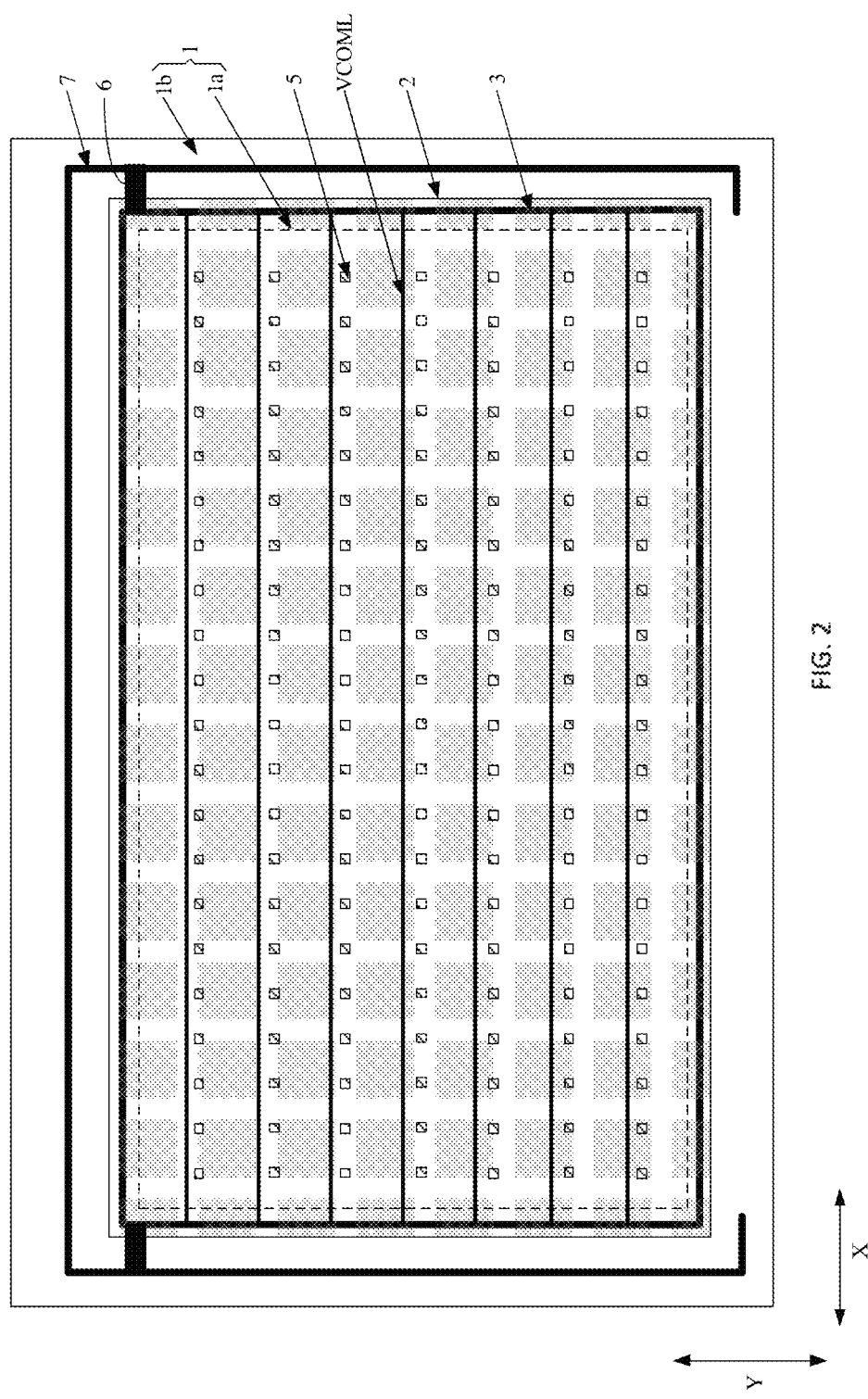
FIG. 2 shows a schematic diagram of a top plan view of a display panel in embodiments of the present disclosure.

In some embodiments, the gate electrode line(s) GL extends along the first direction X, the data line(s) DL extends along the second direction Y, the first direction X and the second direction Y intersect or are perpendicular to each other, and a plurality of sub-pixels SPX arranged in an array along the first direction X and the second direction Y are defined by the plurality of gate lines GL and the plurality of data lines DL. In embodiments of the present disclosure, the first direction X shown in FIG. 2 is a row direction and the second direction Y shown in FIG. 2 is a column direction as an example for exemplary description.

Figure 3:
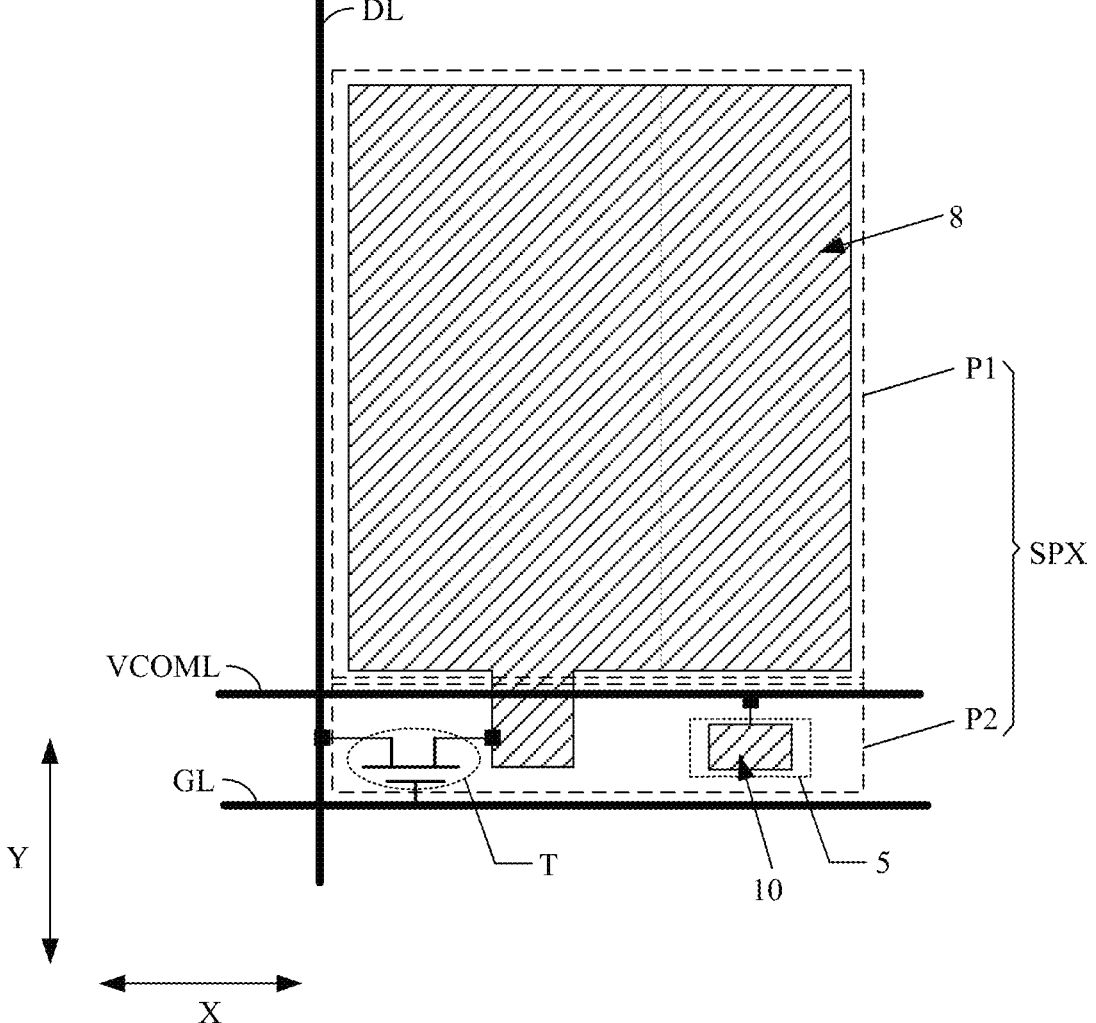
FIG. 3 shows a schematic diagram of a circuit structure in a display region in embodiments of the present disclosure.
Figure 4:
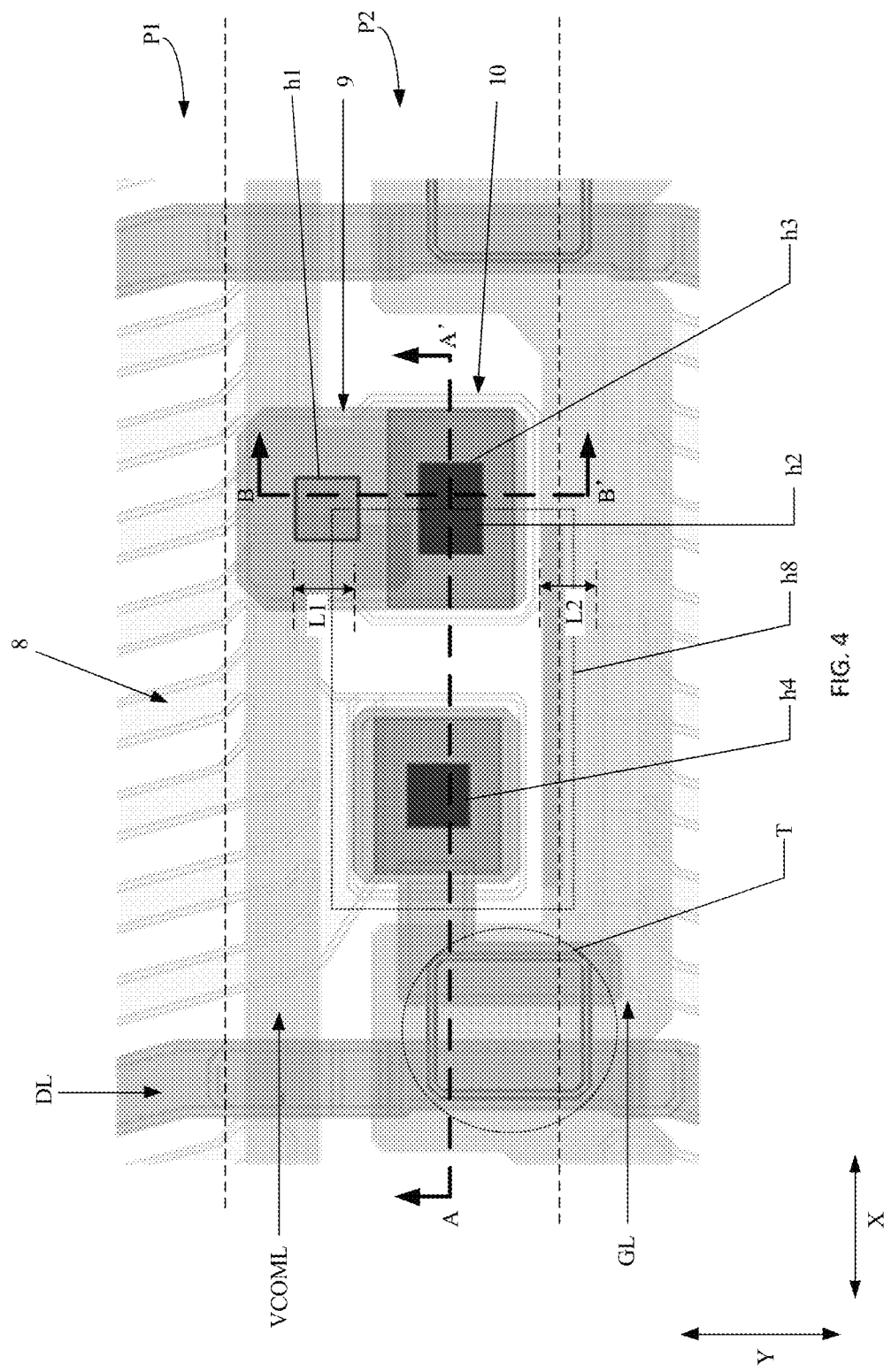
FIG. 4 shows a schematic diagram of a top plan view of a conductive connection region 5 and a surrounding region of the conductive connection region 5 in embodiments of the present disclosure.

Referring to FIGS. 3 and 4, the sub-pixel SPX includes a light emitting region P1 and a non-light emitting region P2 arranged along the second direction Y. The non-light emitting region P2 is closer to the gate line GL corresponding to the pixel region than the light emitting region P1. The thin film transistor T is formed in the non-light emitting region P2, and a fourth via hole Td (i.e., pixel via hole) is also formed in the non-light emitting region P2 and penetrates from the surface of the first passivation layer 14 facing away from the first base substrate 1 to the second electrode Td of the thin film transistor T, and the pixel electrode 8 is formed in the light emitting region P1.

The gate electrode Tg of the thin-film transistor T is electrically connected with the corresponding gate line GL, the first terminal Ts of the thin-film transistor T is electrically connected with the corresponding data line DL, and a portion of the pixel electrode 8 extends into the non-light emitting region P2 to be electrically connected with the second terminal Td of the thin-film transistor T through the corresponding fourth via hole h4 (i.e., pixel via hole) (i.e., a portion of the pixel electrode 8 is in the non-light emitting region P2). The extension direction of the common voltage line VCOML is the same as the extension direction of the gate line GL, and the common voltage line VCOML is in the non-light emitting region and is on a side of the thin film transistor T close to the light emitting region.

In embodiments of the present disclosure, the gate line GL is provided in the same layer as the gate electrode Tg of the thin-film transistor T. That is to say, the gate line GL, the common voltage line VCOML, and the gate electrode Tg of the thin-film transistor T are provided in the same layer.

In some embodiments, the second via hole h2 and the third via hole h3 are both within the non-light emitting region and between the corresponding common voltage line VCOML and the gate electrode line GL.

In some embodiments, the second via hole h2 and the third via hole h3 are arranged along the first direction X.

In some embodiments, the second via hole h2 and the fourth via hole h4 (i.e., pixel via hole) are arranged along the first direction X; and the third via hole h3 and the fourth via hole h4 (i.e., pixel via hole) are arranged along the first direction X.

Referring to FIG. 4, in a row of pixel regions in which the common voltage line VCOML is provided, the thin film transistor T, the fourth via h4 (i.e., pixel via hole), the second via h2, and the third via h3 are between the common voltage line VCOML and the gate line GL, and the fourth via h4 (i.e., pixel via hole), the second via h2, and the third via h3 are arranged along a first direction X. In this manner, the space of the non-light emitting region between the common voltage line VCOML and the gate line GL in the first direction X can be effectively utilized, which is conducive to enhancing the area proportion of the light emitting region in the pixel region, i.e., effectively enhancing the pixel aperture ratio.

In some embodiments, each row of sub-pixels SPX may correspondingly be provided with one common voltage line VCOML. Of course, it is also possible to selectively provide the common voltage line VCOML in a certain one row or multiple rows of sub-pixels SPX. All of these cases shall fall within the claimed scope of the present disclosure.

Referring to FIG. 4, in some embodiments, the spacing L1, L2 between the first conductive connection electrode 10 and two pixel electrodes 8 adjacent to each other in the second direction Y (i.e., the shortest distances between the first conductive connection electrode 10 and the two pixel electrodes 8 adjacent to each other in the second direction Y) is equal. By the above design, a certain process error margins (Margins) between the first conductive connection electrode 10 and the two pixel electrodes 8 adjacent to each other in the second direction Y.

Figure 5:
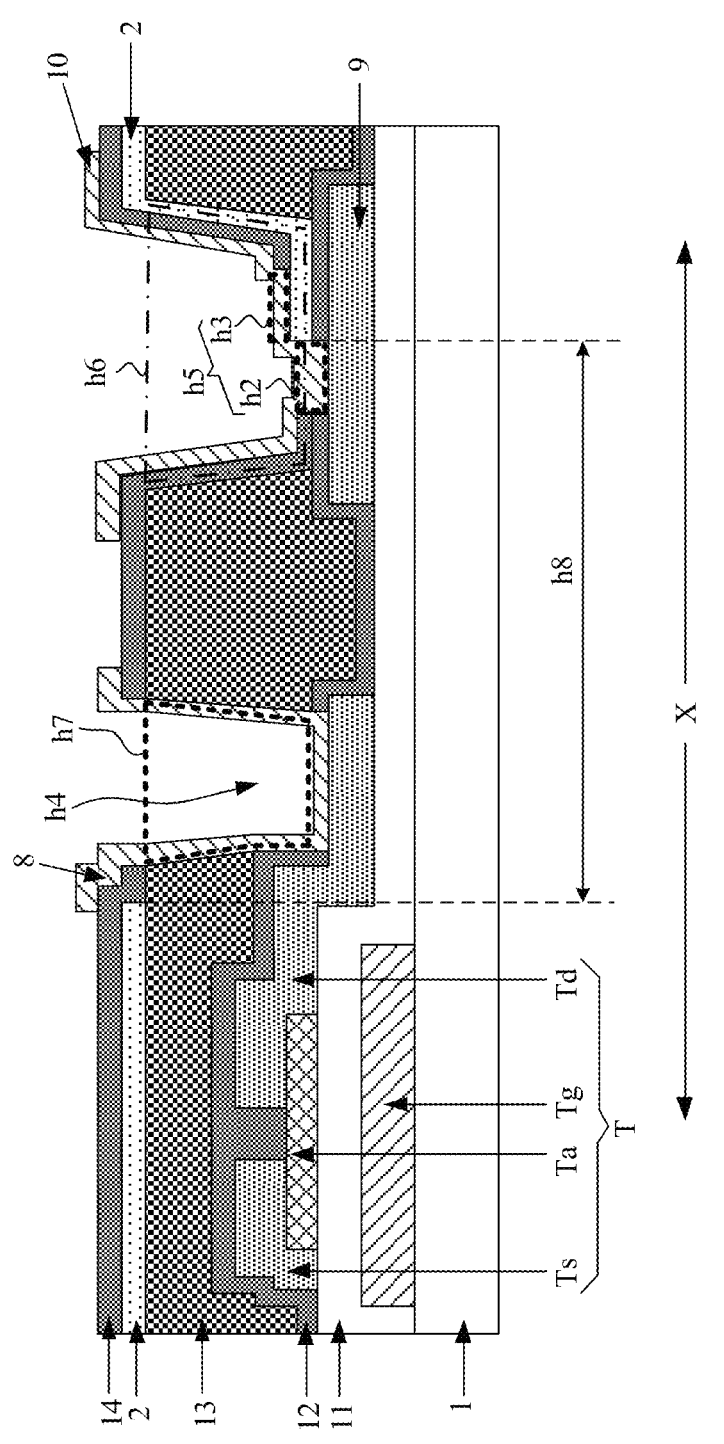
FIG. 5 is a schematic diagram of a cross-section in an A-A' direction in FIG. 4.
Figure 6:
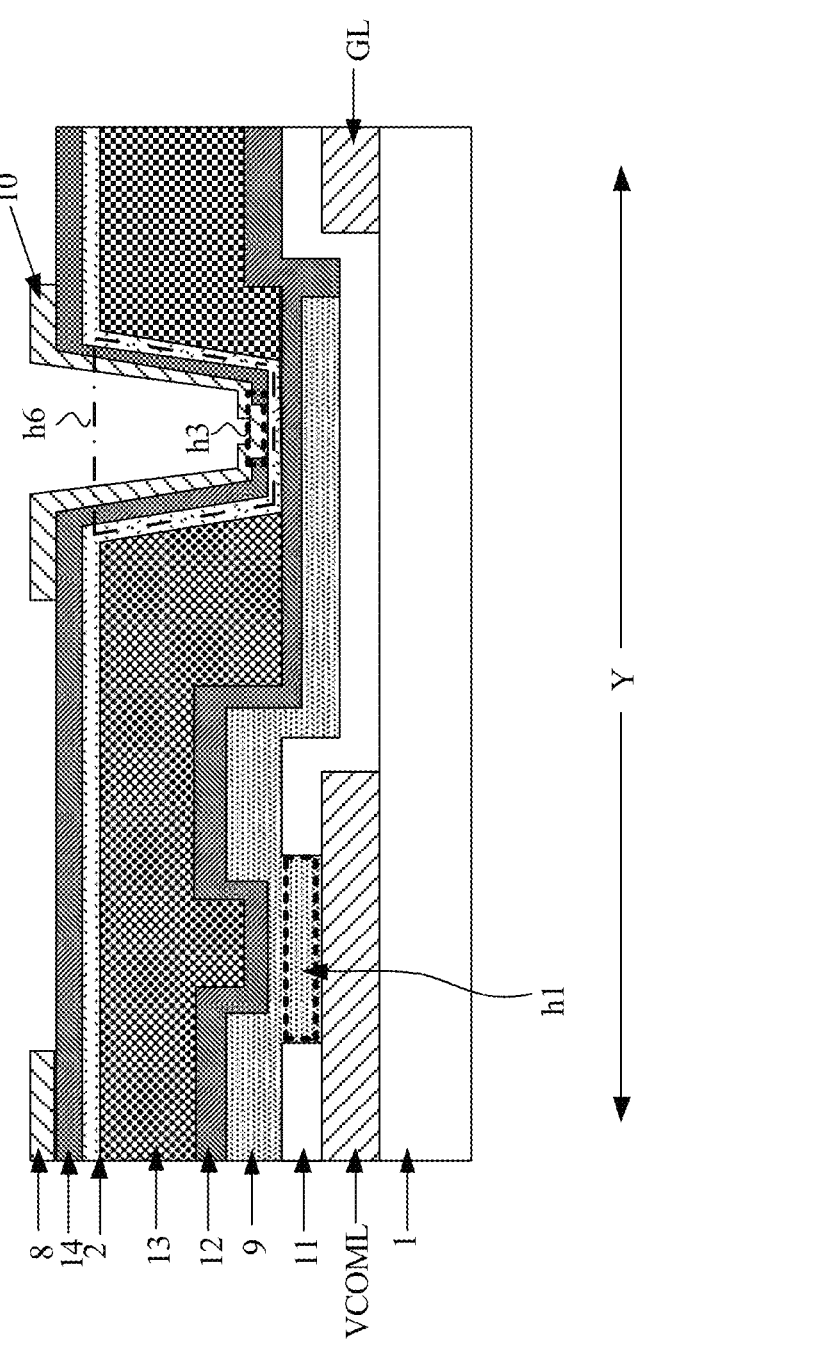
FIG. 6 is a schematic diagram of a cross-section in a B-B' direction of FIG. 4.
Figure 7A:
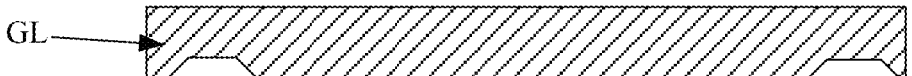
FIGS. 7A to 7J are schematic diagrams of top views of film layers on a first base substrate in embodiments of the present disclosure.
Figure 7A:
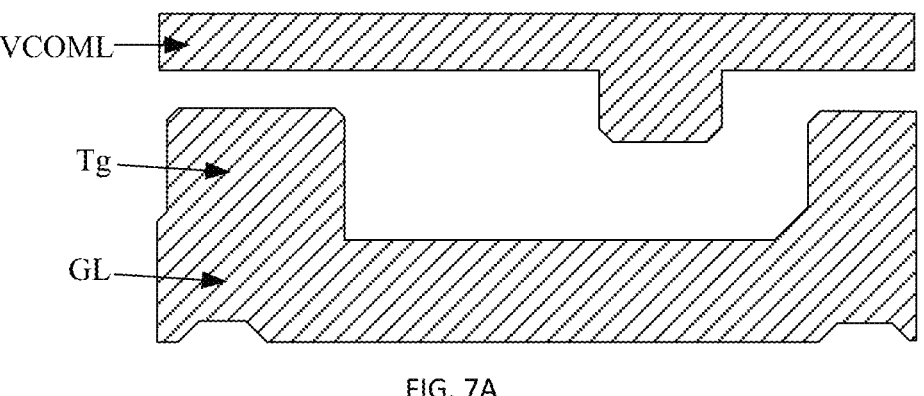
Figure 7B:
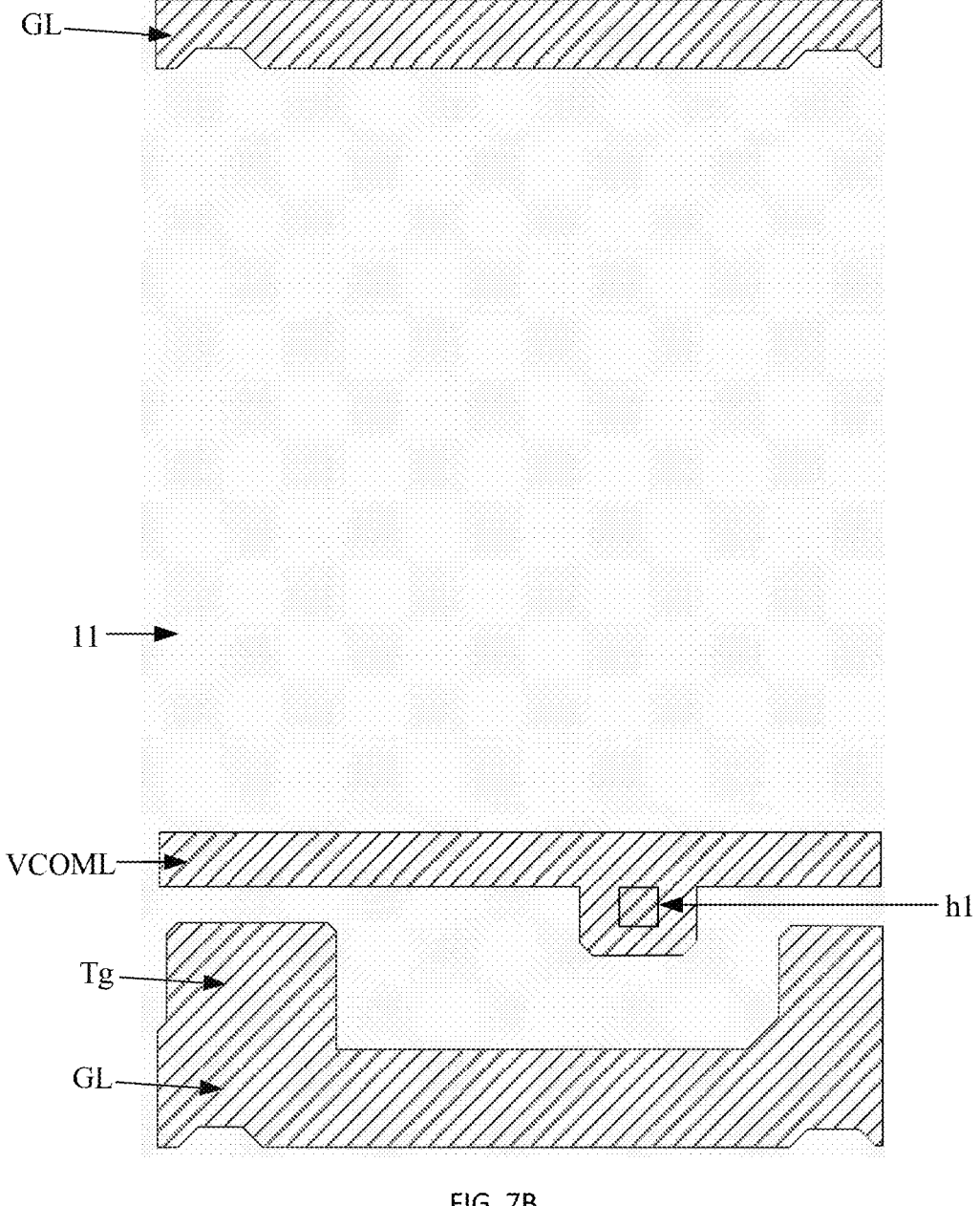
Figure 7C:
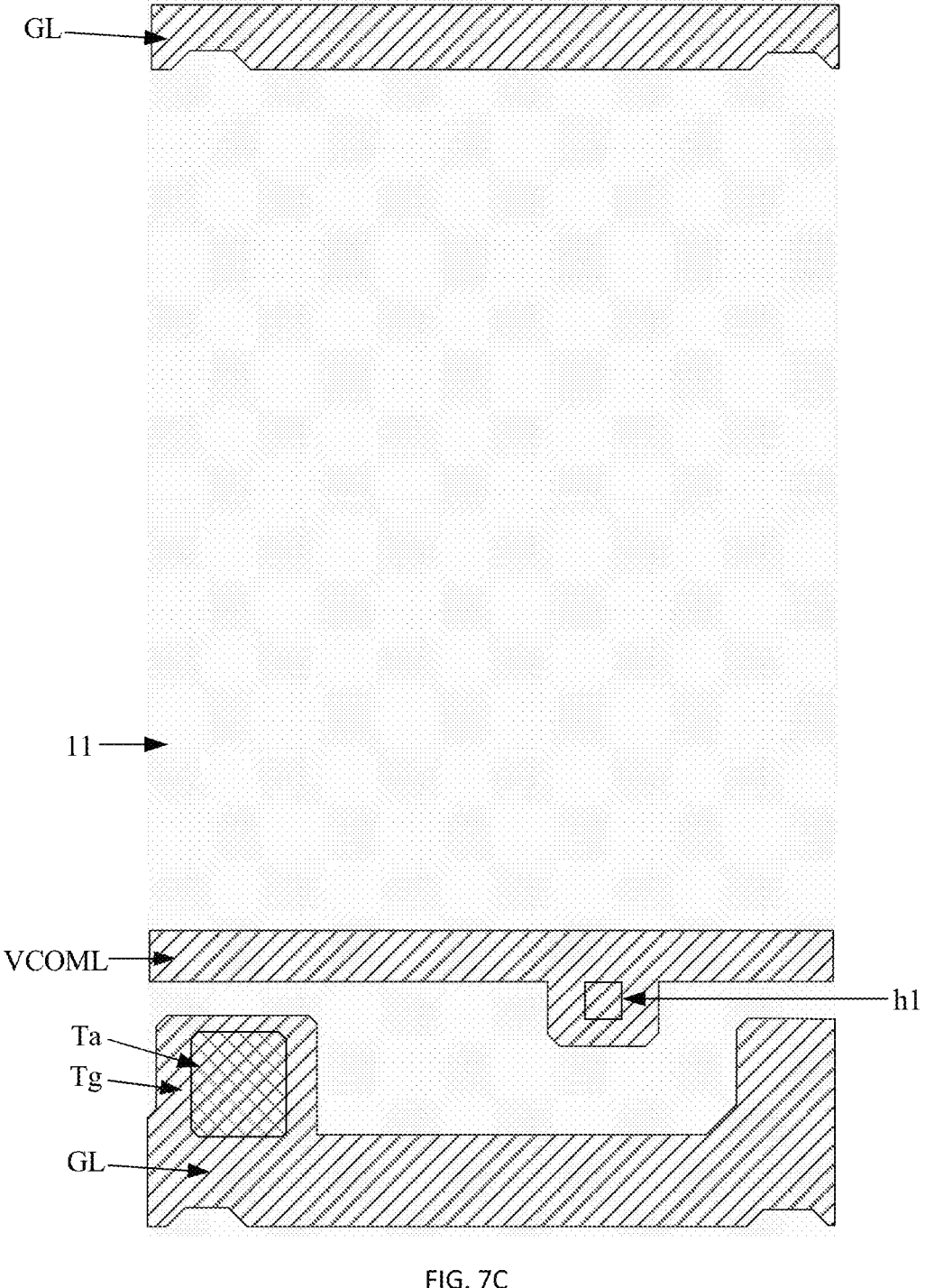
Figure 7D:
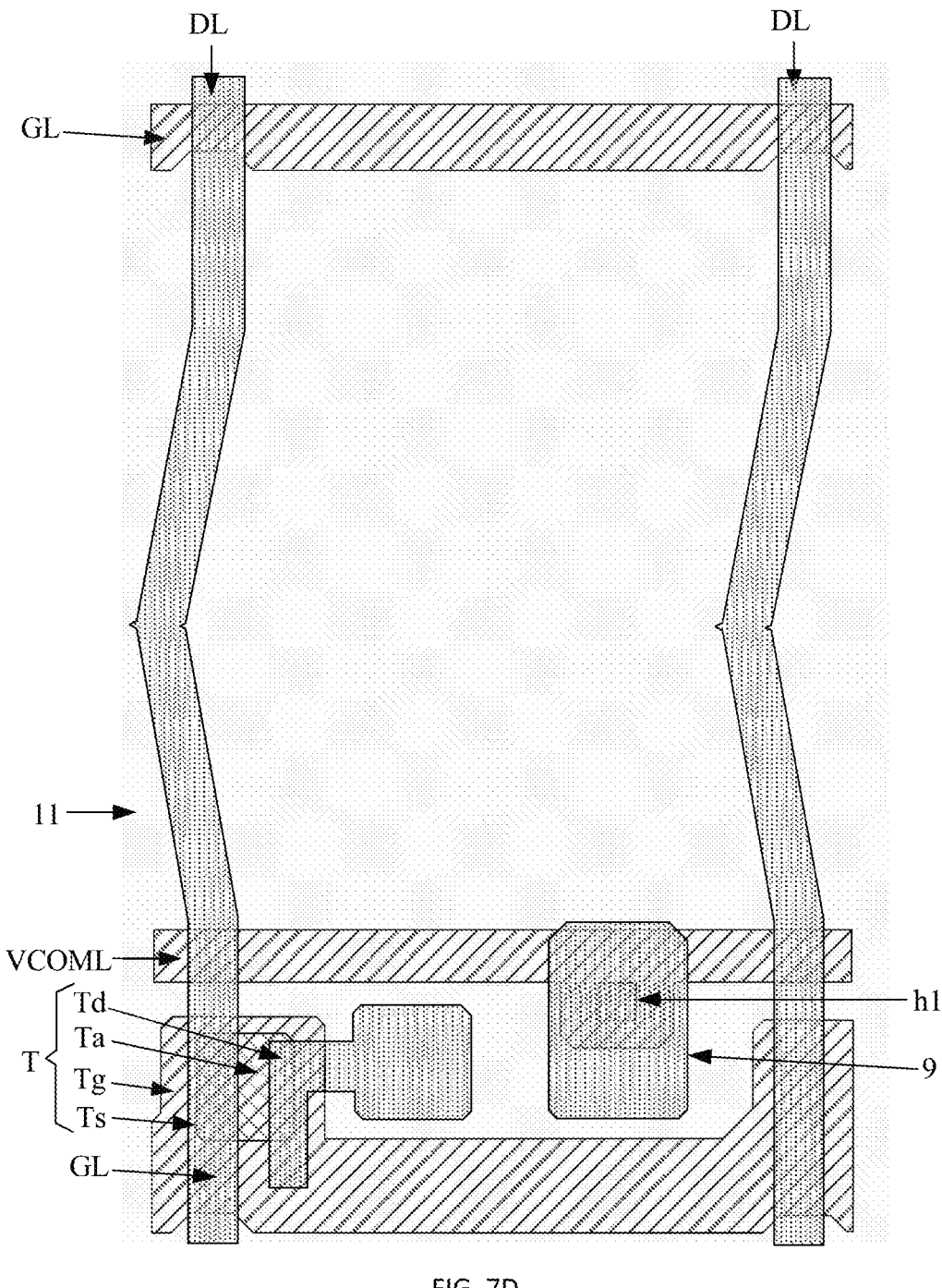
Figure 7E:
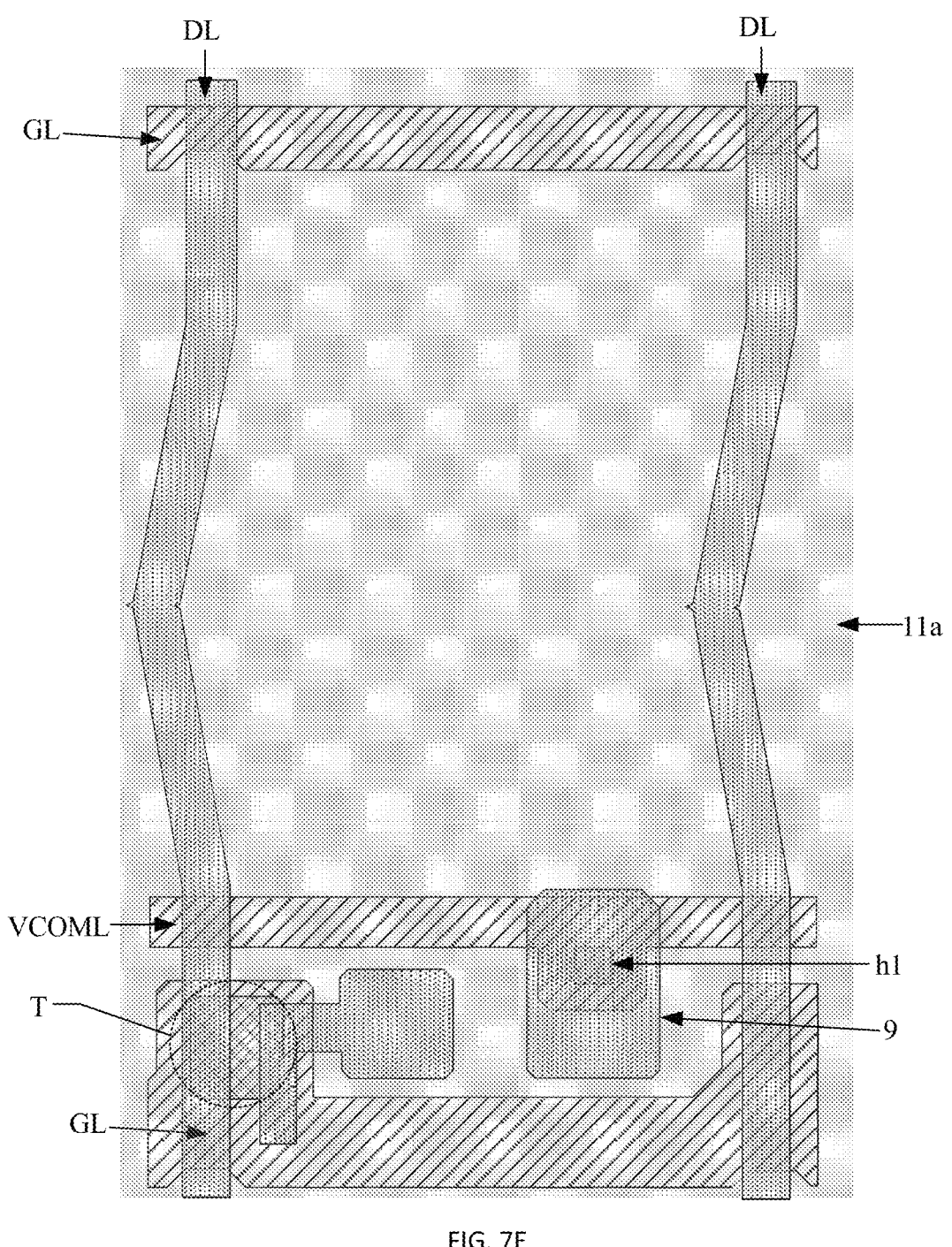
Figure 7F:
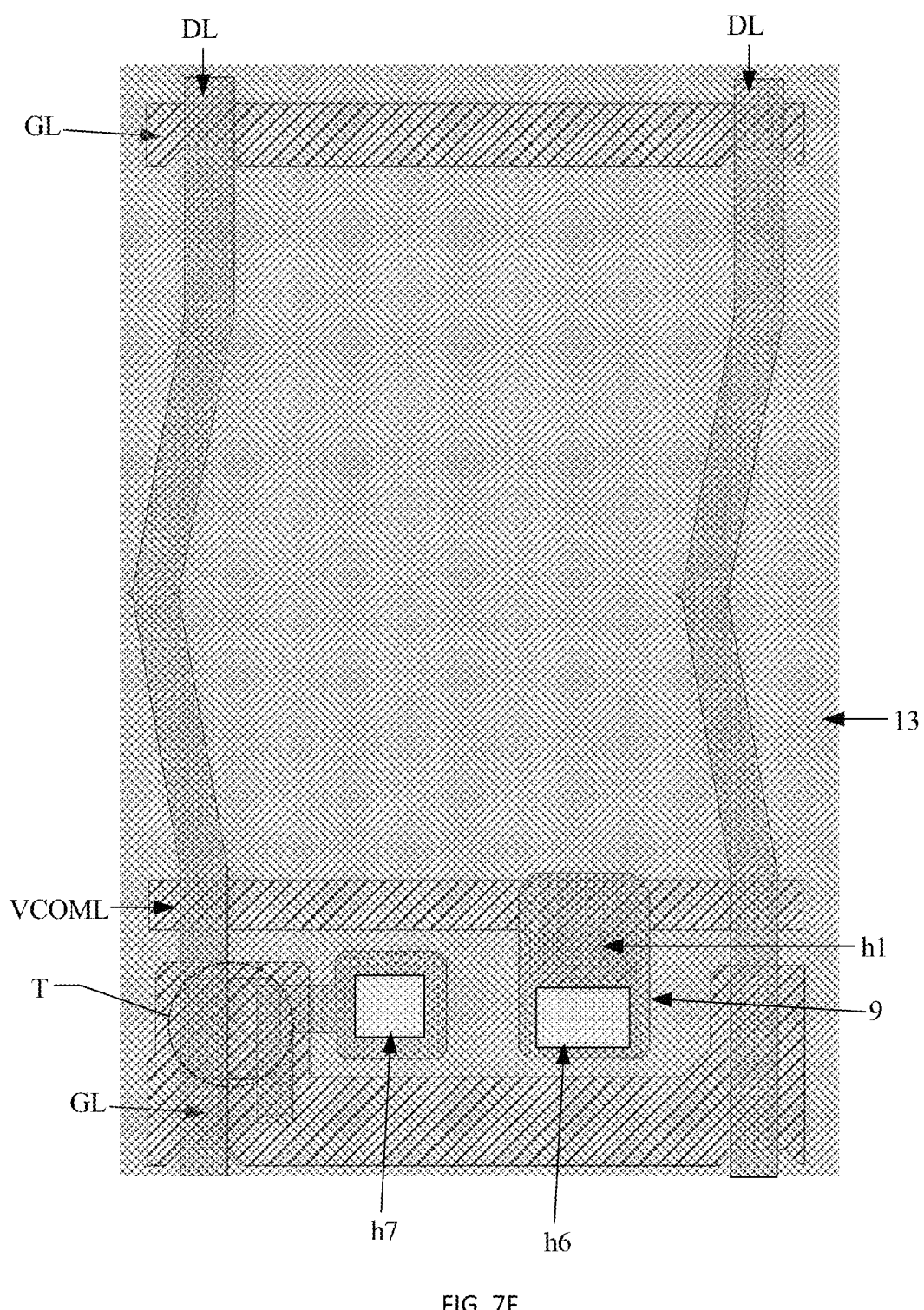
Figure 7G:
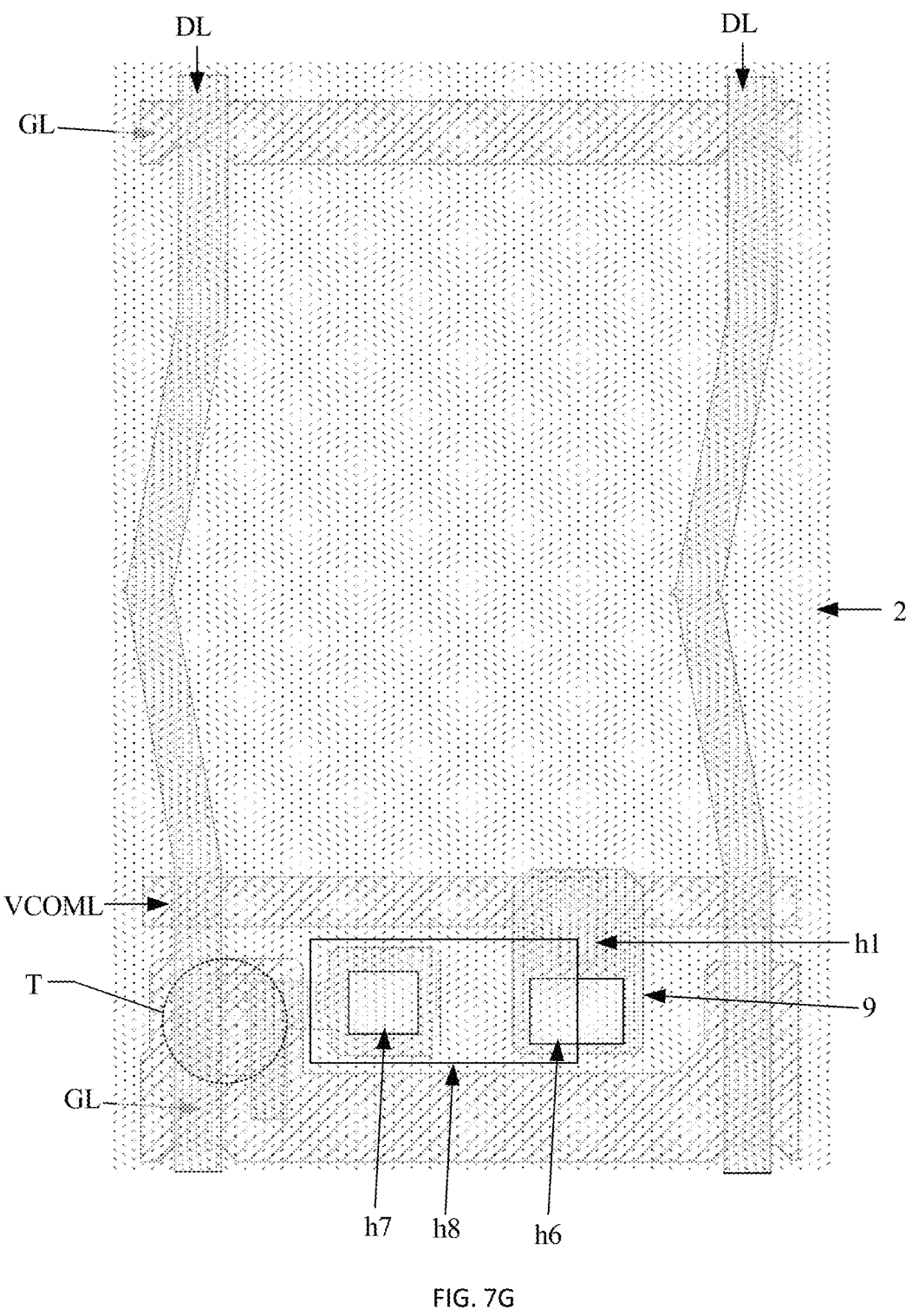
Figure 7H:
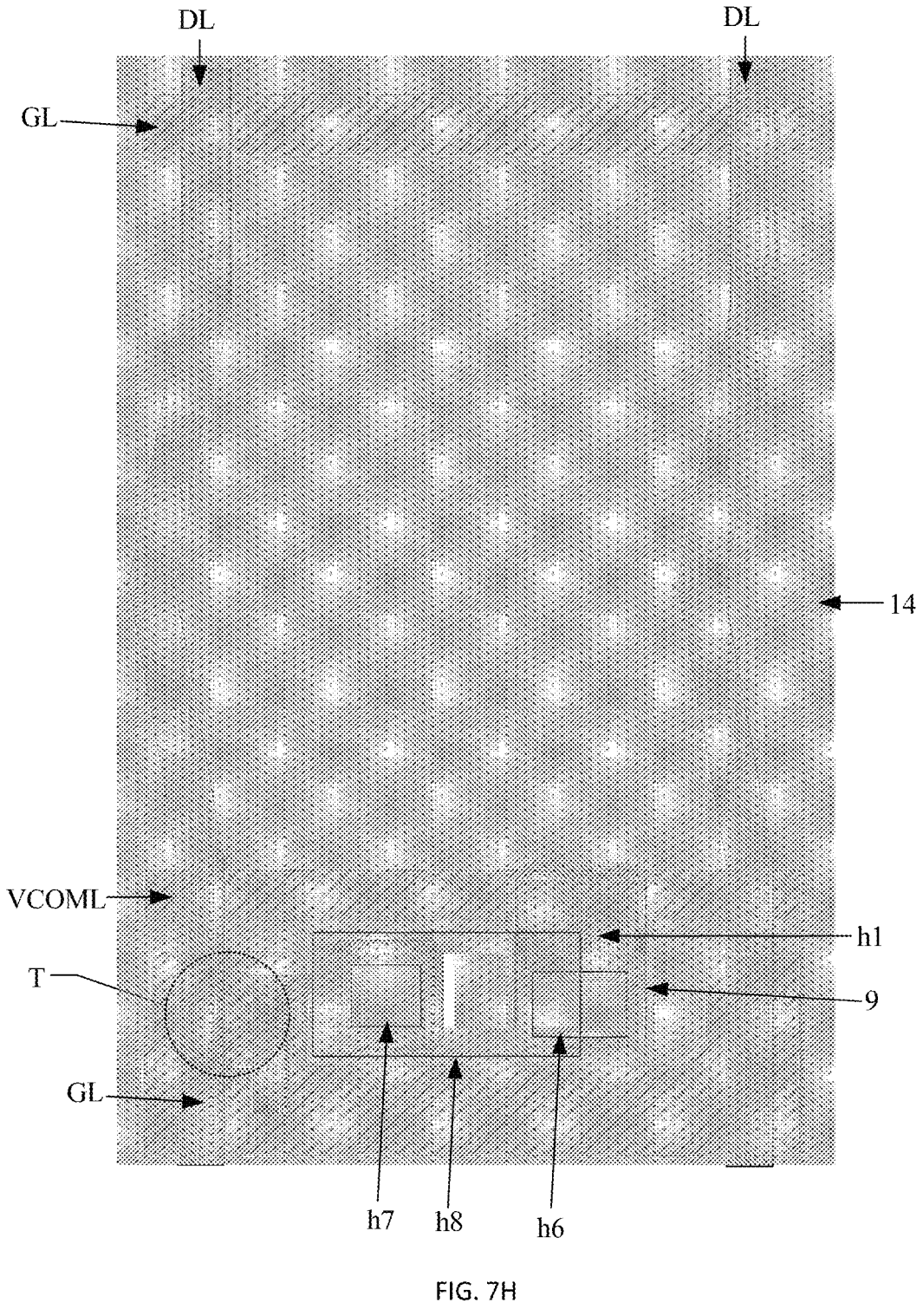
Figure 7I:
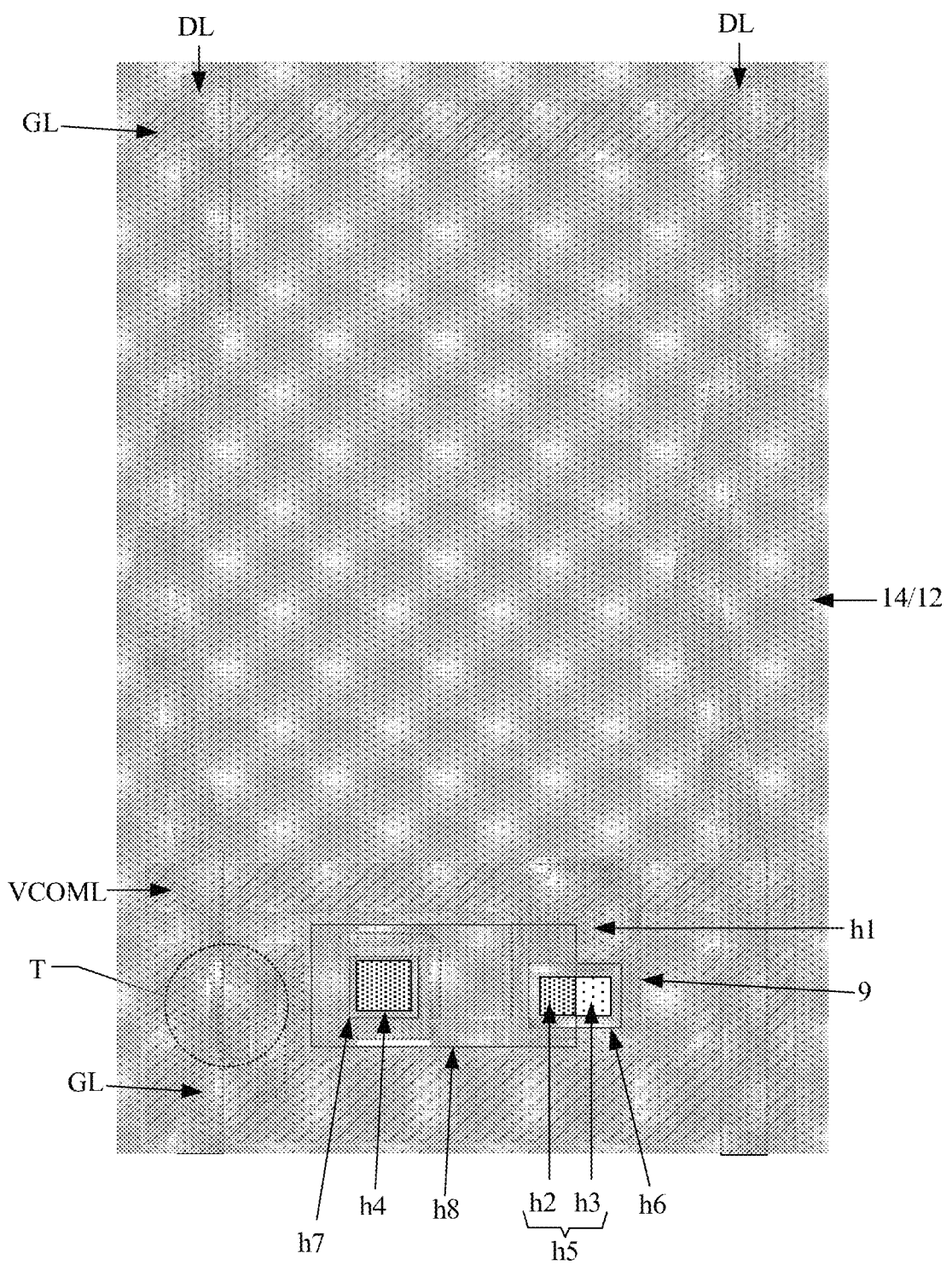
Figure 7J:
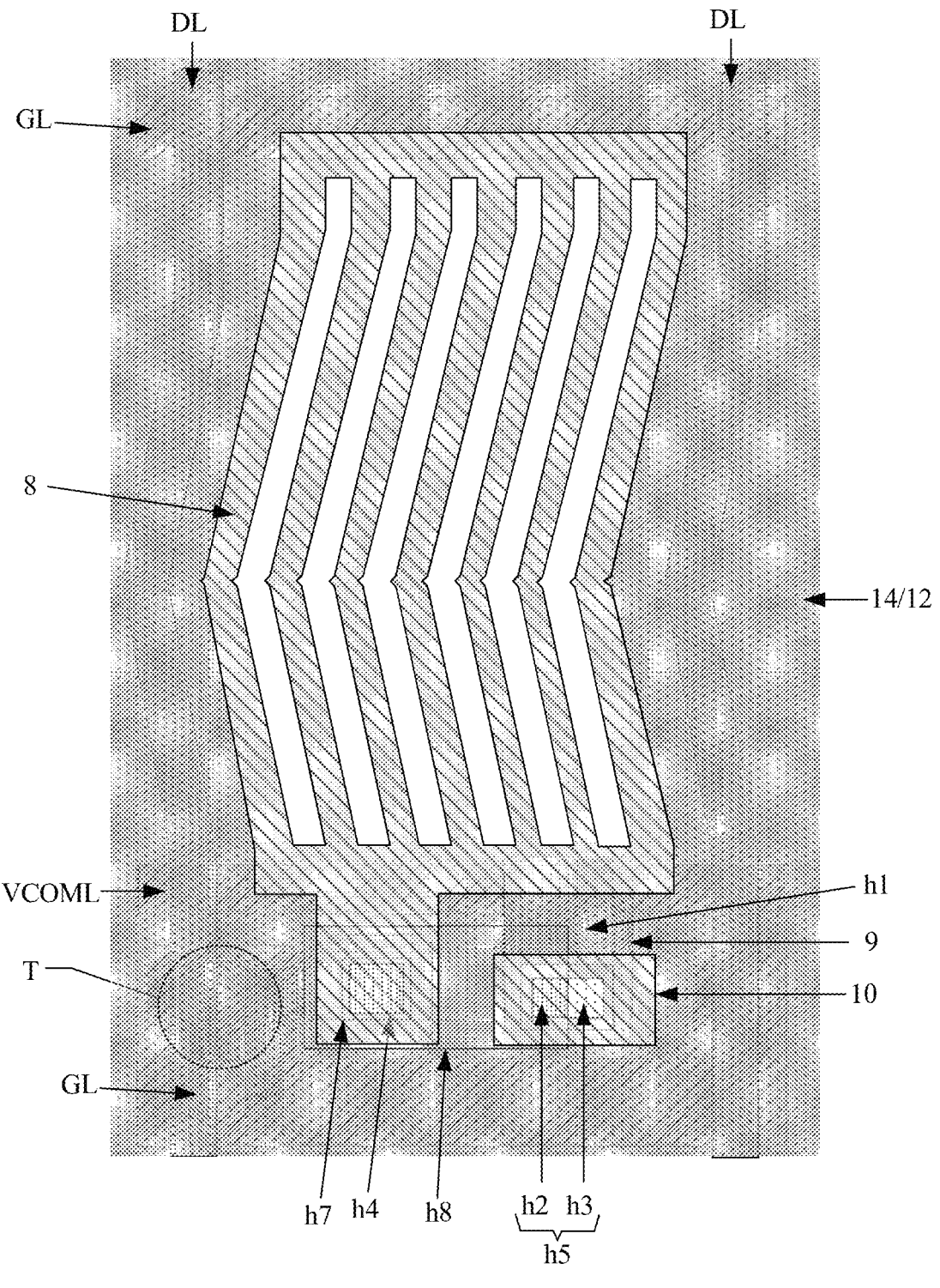

Referring to FIGS. 5 to 7, in some embodiments, a fifth via hole h5 (i.e., common electrode via hole) is formed in the conductive connection region 5 and penetrates from the surface of the first passivation layer 14 facing away from the first base substrate 1 to the second conductive connection electrode 9 and the common electrode 2. The second via hole h2 is a portion of the fifth via hole h5 (i.e., common electrode via hole) penetrating to the second conductive connection electrode 9, and the third via hole h3 is a portion of the fifth via hole h5 (i.e., common electrode via hole) penetrating to the common electrode 2.

That is to say, in the embodiment of the present disclosure, the second via hole h2 and the third via hole h3 are connected with each other to form the fifth via hole h5 (i.e., common electrode via hole). Or, in the present disclosure, a portion of the fifth via hole h5 (i.e., common electrode via hole) can be used as the second via hole h2, and another portion of the fifth process can be used as the third via hole h3. Then, the first conductive connection electrode 10 can be contacted with both the corresponding second conductive connection electrode 9 and the common electrode 2 by only one fifth via hole h5 (i.e., common electrode via hole) to realize the electrical connection.

In practice, the size of the smallest via hole (the area of the projection of the via hole on the base substrate) that can be formed by the patterning process is limited by process constraints, and the size of the smallest via hole is related to factors such as the material and thickness of the thin film to be processed. If the size of the smallest via hole that can be formed by the patterning process in the present disclosure is a and when the second via hole h2 and the third via hole h3 are two via holes provided at intervals, then in order to form the second via hole h2 and the third via hole h3, the minimum aperture area required in the conductive connection region 5 is 2*a; and when the second via hole h2 and the third via hole h3 are two different parts of one fifth via hole h5 (i.e., common electrode via hole), the minimum required aperture area in a conductive connection region 5 is a. It can be seen that, by using a portion of the fifth via hole h5 (i.e., common electrode via hole) as the second via hole h2, and another portion of the fifth via hole h5 (i.e., common electrode via hole) as the third via hole h3, the aperture area can be effectively reduced, which is conducive to reducing the overall area of the non-light emitting region, so as to enhance the pixel aperture ratio.

In addition, in embodiments of the present disclosure, the depth of the second via hole h2 is greater than the depth of the third via hole h3, and the second via hole h2 is connected with the third via hole h3, i.e., forming a shallow and deep via hole connection (forming a stepped surface) design. In the subsequent preparation process of the alignment film (also referred to as the PI film), the above shallow and deep via hole connection design can increase the fluidity of the PI liquid during PI coating, and avoid uneven PI diffusion due to poor fluidity of the PI liquid at the deep via hole position.

In some embodiments, the thickness of the first conductive connection electrode 10 in the region in which the second via hole h2 is located is greater than the thickness of the first conductive connection electrode 10 in the region in which the third via hole h3 is located. In embodiments of the present disclosure, by increasing the thickness of the first conductive connection electrode 10 in the region in which the second via hole h2 is located, the thickness of the first conductive connection electrode 10 in the region in which the second via hole h2 is located is greater than the thickness of the first conductive connection electrode 10 in the region in which the third via hole h3 is located, which, on the one hand, can effectively reduce the resistance of the first conductive connection electrode 10 in the region in which the second via hole h2 is located, thereby reducing the overall resistance of the first conductive connection electrode, and on the other hand, can also effectively reduce the depth difference between the deep hole location and the shallow hole location, which is conducive to the uniform diffusion of the PI.

In some embodiments, the planarization layer 13 is between the second passivation layer 12 and the common electrode 2, and the planarization layer 13 is formed with a sixth via hole h6 and a seventh via hole h7 in the conductive connection region 5. The sixth via hole h6 completely covers the region of the fifth via hole h5, and the seventh via hole h7 completely covers the region of the fourth via hole h4. As well, a portion of the common electrode 2 is within the sixth via hole h6; an orthographic projection h6' of the sixth via hole h6 on the first base substrate 1 covers an orthographic projection h2' of the second via hole h2's on the first base substrate 1 and an orthographic projection h3' of the third via hole h3's on the first base substrate 1.

In some embodiments, the slope angle corresponding to the sidewall, forming the sixth via hole h6, of the leveling layer 13 ranges from 30° to 80°.

It should be noted that "slope angle of the sidewall" in the present disclosure refers to the angle of the sidewall with respect to the bottom surface of the film layer structure in which the sidewall is located.

Taking the planarization layer as an example, generally, the smaller the slope angle of the sidewall of the sixth via hole h6 is, the lower the risk of fracture of subsequent structures (e.g., the common electrode 2, the first passivation layer 14, and the first conductive connection electrode 10) formed on the sidewall; but the overall size of the sixth via hole h6 is larger, which is not conducive to enhancing the pixel aperture ratio. The larger the slope angle is, the larger the risk of fracture of the subsequent structures formed on the sidewall, but the overall size of the sixth via hole h6 is smaller, which is more conducive to enhancing the pixel aperture ratio. Based on the combined consideration of the risk of fracture of the film layer and the pixel aperture ratio, in the embodiments of the present disclosure, the slope angle corresponding to the sidewall forming the sixth via hole h6 of the planarization layer 13 is set in a range of 30° to 80°.

In some embodiments, the slope angle corresponding to the side wall forming the second via hole h2 of the second passivation layer 12 is in a range of 15° to 50°; and the slope angle corresponding to the side wall forming the third via hole h3 of the first passivation layer 14 is in a range of 15° to 50°.

Figure 8:
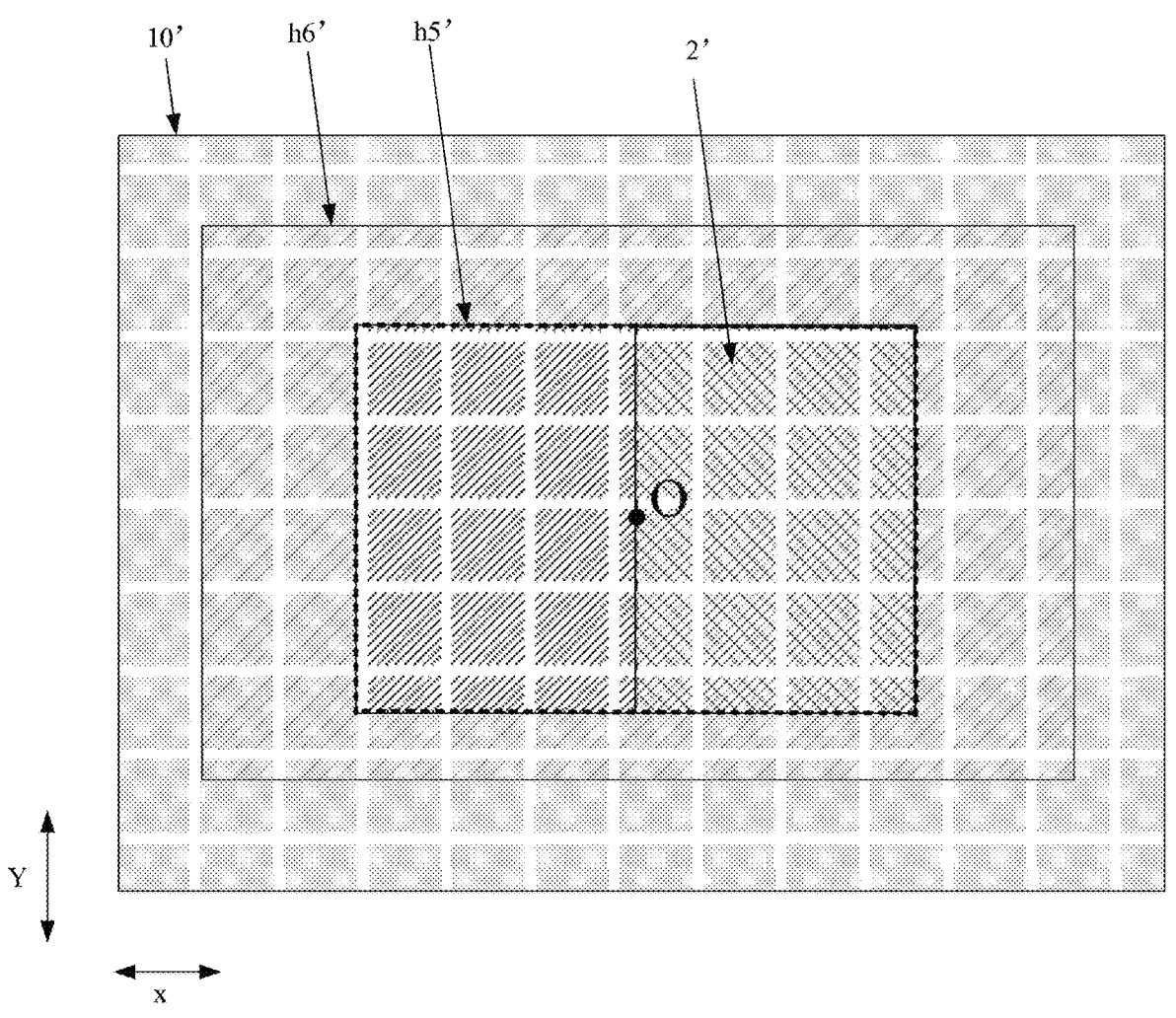
FIG. 8 is a schematic diagram of an orthographic projection of associated via holes in embodiments of the present disclosure.

FIG. 8 shows a schematic diagram of a top view of an orthographic projection of the fifth via hole h5 (i.e., common electrode via hole), the first conductive connection electrode 10, and the sixth via hole h6 on the first base substrate 1 in the embodiments of the present disclosure. As shown in FIG. 8, in some embodiments, for any one fifth via hole h5, the bottom of the fifth via hole h5 has a first orthographic projection h5' on the first base substrate 1, and the portion of the common electrode 2 exposed by the fifth via hole h5 has a second orthographic projection 2' on the first base substrate 1. The second orthographic projection 2' has an area that is half the area of the first orthographic projection h5'.

In the present disclosure, in order to make the second conductive connection electrode 9 also have a sufficiently exposed area, the area of the second orthographic projection 2' is half of the area of the first orthographic projection h5', so as to ensure that the first conductive connection electrode 10 is able to have a large contact area with both the common electrode 2 and the second conductive connection electrode 9 as well.

Of course, the area of the second orthographic projection 2' in the present disclosure is not limited to half of the area of the first orthographic projection h5'. Specifically, the ratio of the area of the second orthographic projection 2' to the area of the first orthographic projection h5' can be taken within a certain range (e.g., 20% to 80%), which also ensures that the first conductive connection electrode 10 can realize a reliable electrical connection with both the common electrode 2 and the second conductive connection electrode 9.

In some embodiments, the boundary of the second orthographic projection 2' passes through the center of the first orthographic projection h5'.

In some embodiments, the first orthographic projection h5' has a shape of a first rectangle and the second orthographic projection 2' has a shape of a second rectangle; the length of the first rectangle in the first direction X is half the length of the second rectangle in the first direction X; and the length of the first rectangle in the second direction Y is equal to the length of the second rectangle in the second direction Y.

It should be noted that "rectangle" in the present disclosure includes not only rectangles with right-angled corners, but also rectangles with rounded or chamfered top corners.

In some embodiments, the fifth via hole h5 and the first via hole h1 are arranged in the second direction Y.

In some embodiments, the center O of the orthographic projection h5' of the fifth via hole h5 on the first base substrate 1 overlaps with the center 10' of the orthographic projection 10' of the first conductive connection electrode 10 on the first base substrate 1.

In some embodiments, within the same one conductive connection region 5, the orthographic projection h2' of the bottom of the second via hole h2 on the first base substrate 1 has a first projected area, and the orthographic projection h3' of the bottom of the third via hole h3 on the first base substrate 1 has a second projected area; and the first projected area is equal to the second projected area.

In some embodiments, within the same one conductive connection region 5, the first conductive connection electrode 10 has a first contact area with the corresponding second conductive connection electrode 9, and the first conductive connection electrode 10 has a second contact area with the portion of the common electrode 2 within the conductive connection region 5; and the first contact area is equal to the second contact area.

By the above design, the connection between the first conductive connection electrode 10 and the second conductive connection electrode 9 as well as the common electrode 2 more solid.

Continuing to refer to FIG. 8, for any one sixth via hole h6, the sixth via hole h6 has a third orthographic projection h6' on the first base substrate 1, and the portion of the common electrode 2 within the sixth via hole h6 has a fourth orthographic projection 2' on the first base substrate 1; and the fourth orthographic projection 2' has an area that is half the area of the third orthographic projection h6'.

In some embodiments, the boundary of the fourth orthographic projection 2' passes through the center of the third orthographic projection h6'.

In some embodiments, the third orthographic projection h6' has a shape of a third rectangle and the fourth orthographic projection 2' has a shape of a fourth rectangle; the length of the third rectangle in the first direction X is half the length of the fourth rectangle in the first direction X; and the length of the fourth rectangle in the second direction Y is equal to the length of the fourth rectangle in the second direction Y.

In some embodiments, the orthographic projection 10' of the first conductive connection electrode 10 on the first base substrate 1 covers the orthographic projection h6' of the sixth via hole h6 on the first base substrate 1. That is, the area of the orthographic projection of the fifth via hole h5 on the first base substrate 1 is smaller or equal to the area of the orthographic projection of the sixth via hole h6 on the first base substrate 1, while the area of the orthographic projection of the sixth via hole h6 on the first base substrate 1 is smaller or equal to the area of the orthographic projection of the first conductive connection electrode 10 on the first base substrate 1. By the above design, the fifth via hole h5, the sixth via hole h6, and the first conductive connection electrode 10 can have a high tolerance of alignment error.

In some embodiments, the center of the orthographic projection of the sixth via hole h6 on the first base substrate 1 overlaps with the center of the orthographic projection of the first conductive connection electrode 10 on the first base substrate 1.

In some embodiments, the second via hole h2, the third via hole h3, the fifth via hole h5, the sixth via hole h6, and the first conductive connection electrode 10 have a rectangular or approximately rectangular (e.g., a rectangle with chamfered corners) on a cross-section parallel to the first base substrate 1.

In some embodiments, the second via hole h2 has a length of 3.5 um in the first direction X, and the second via hole h2 has a length of 5 um in the second direction Y; the third via hole h3 has a length of 3.5 um in the first direction X, and the third via hole h3 has a length of 5 um in the second direction Y; the fifth via hole h5 has a length of 7 um in the first direction X, and the fifth via hole h5 has a length of 5 um in the second direction Y; the length of the sixth via hole h6 in the first direction X is 12 um, and the length of the sixth via hole h6 in the second direction Y is 7 um; the length of the first conductive connection electrode 10 in the first direction X is 15 um, and the length of the first conductive connection electrode 10 in the second direction Y is 12 um.

In some embodiments, the thickness of the common voltage line VCOML is about 3350 Å, the thickness of the insulating layer 11 is about 4000 Å, the thicknesses of the first electrode Ts, the second electrode Td are about 3500 Å, the thickness of the active layer Ta is about 900 Å, the thickness of the second passivation layer 12 is about 1000 Å, the thickness of the planarization layer 13 is about 25,000 Å, the thickness of the common electrode 2 is about 900 Å, the thickness of the first passivation layer 14 is about 3000 Å, and the thickness of the pixel electrode 8 is about 700 Å. In this manner, the second via hole h2 has an aperture depth of about 2.97 um, and the third via hole h3 has an aperture depth of about 2.8 um. In some embodiments, the sizes of the fifth via hole may include, but are not limited to, 9 um*14 um.

Continuing to refer to FIG. 4 shown earlier, the common electrode 2 is formed with an eighth via hole h8, and an orthographic projection of the eighth via hole h8 on the first base substrate 1 completely covers the region subsequently used to form the fourth via hole h4 to ensure that the subsequently formed fourth via hole h4 can penetrate to the second electrode Td of the thin film transistor T; and the orthographic projection of the eighth via hole h8 on the first base substrate 1 also completely covers the region subsequently used to form the region of the second via hole h2 to ensure that the subsequently formed second via hole h2 can penetrate to the second conductive connection electrode 9. In some embodiments, the sizes of the fourth via hole may include, but are not limited to, 9 um*11 um.

Continuing to refer to FIG. 2, as shown in FIG. 2, in some embodiments, common voltage peripheral leads 3 are provided in both peripheral regions 1b on both sides of the display region 1a opposite to each other along the first direction X. The two ends of the common voltage line VCOML respectively extend into the peripheral regions 1b and are electrically connected with the common voltage peripheral leads 3. By the above design, the loading speed of the common voltage signal on the common voltage line VCOML can be improved, which is conducive to further improving the loading speed of the common voltage signal on the common electrode 2.

In some embodiments, the common voltage peripheral leads 3 are disposed around the display region 1a. The display panel further includes: a common voltage writing lead 7, and the common voltage writing lead 7 is within the peripheral area 1b and on a side of the common voltage peripheral lead 3 facing away from the display region. The common voltage writing lead 7 is electrically connected (e.g., electrically connected via the conductive connection structure 6) to the common voltage peripheral lead 3. A common voltage signal provided by an external chip (not shown) can be received via the voltage writing lead and the common voltage signal can be transmitted to the common voltage peripheral lead 3.

Based on the same inventive concept, embodiments of the present disclosure also provide a display apparatus, including the display panel as provided in the above embodiments. The display apparatus solves the problem in a similar principle as the aforementioned display panel, so the implementation of the display apparatus can be referred to the implementation of the aforementioned display panel, and the repetition will not be repeated herein.

In embodiments of the present disclosure, the display apparatus may be: a wearable device, a mobile phone, a tablet computer, a television, a monitor, a laptop computer, a digital photo frame, a navigator, and any other product or component with a display function. Other indispensable components of the display apparatus should be understood by a person of ordinary skill in the art, and are not described herein, nor should they be used as a limitation of the present disclosure.

In some embodiments, the material forming the film layer in which the common voltage line VCOML is located may be a metallic material, such as copper, aluminum, molybdenum, or alloy.

In some embodiments, the material forming the insulating layer may include silicon oxide, silicon nitride, etc.

In some embodiments, the material forming the active layer of the thin film transistor may be an oxide type active material.

In some embodiments, the material forming the film layer in which the data lines are located may be a metallic material, such as copper, aluminum, molybdenum, or alloy.

In some embodiments, the material forming the first passivation layer and the second passivation layer may include silicon oxide and/or silicon nitride.

In some embodiments, the material forming the planarization layer may include an organic material, such as photoresist.

In some embodiments, the material forming the common electrode may include a transparent conductive material, such as a metal oxide material, such as ITO (indium tin oxide).

In some embodiments, the material forming the film layer in which the pixel electrode is located may include a transparent conductive material, such as a metal oxide material, such as ITO.

Figure 9:
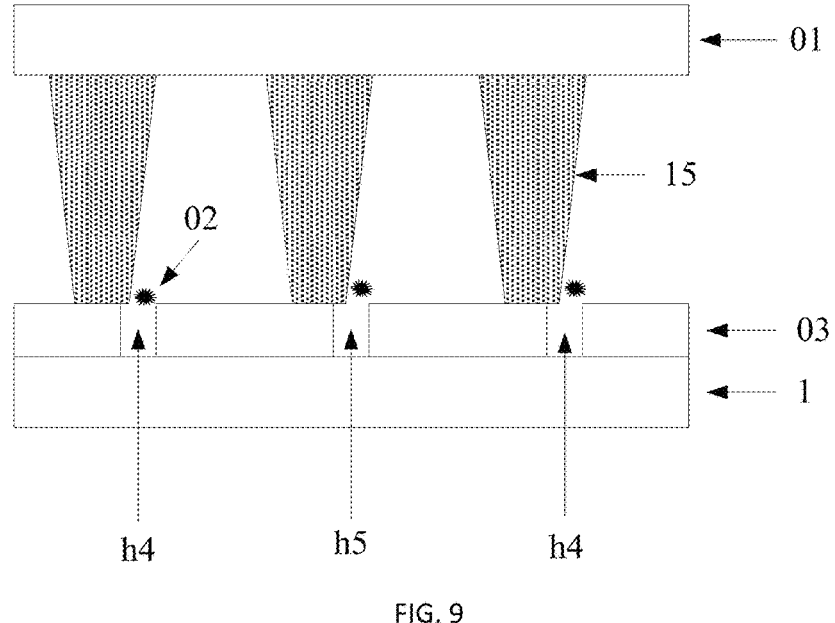
FIG. 9 is a schematic diagram of a cross-sectional structure of a display panel in the related art.

As shown in FIG. 9, the spacer 15 is located between the first base substrate 1 and the second base substrate 01. After the array substrate and the opposite substrate have been fabricated to form the Cell into a box, the spacer (Post Spacer (PS)) 15 is provided inside the box to act as a support. Usually, the spacer is fabricated on the second base substrate, and its main function is to ensure the support strength inside the display panel box, and to prevent breakage when pressed or slightly dropped. Due to the friction between the spacer and the film layer 03 (especially the film layer 03 around the fourth via hole h4 and the fifth via hole h5) on the first base substrate when the display panel is subjected to external force, PI film layer debris 02 may be generated, which may lead to the problem of bad broken bright dots after the display panel is energized.

In embodiments of the present disclosure, in the first direction, an orthographic projection of the spacer on the first base substrate is located between the orthographic projection of the common electrode via hole corresponding to the first sub-pixel SPX1 on the first base substrate and the orthographic projection of the pixel via hole corresponding to the second sub-pixel SPX2 on the first base substrate, i.e., the spacer is provided between the common electrode via hole and the pixel via hole that are adjacent to each other to prevent the spacer from falling into the pixel via hole or the common electrode via hole to affect the support inside the box when the spacer is too close to the pixel via hole or the common electrode via hole. Moreover, this also prevents the spacer in the box from rubbing against the pixel via hole or the common electrode via hole under external force to generate PI debris, which may cause a problem of bad broken bright dots when the display panel is energized.

In some embodiments, as shown in FIGS. 10A to 14A, each sub-pixel is correspondingly provided with a common electrode via hole (i.e., the fifth via hole h5) and a pixel via hole (i.e., the fourth via hole h4). The plurality of sub-pixels include two sub-pixels adjacent to each other along the first direction X, and the two sub-pixels include a first sub-pixel SPX1 and a second sub-pixel SPX2. In the first direction X, the orthographic projection of at least one spacer (e.g., each spacer) of the plurality of spacer on the first base substrate 1 is located between the orthographic projection of the common electrode via hole (i.e., the fifth via hole h5) corresponding to the first sub-pixel SPX1 on the first base substrate 1 and the orthographic projection of the pixel via hole (i.e., the fourth via hole h4) corresponding to the second sub-pixel SPX2 on the first base substrate 1.

In some embodiments, as shown in FIGS. 10A to 14A, the spacers may be columnar spacers. The plurality of spacers may include a plurality of spacers of different sizes. For example, the plurality of spacers include two sizes of spacers: a plurality of first spacers 151 and a plurality of second spacers 152, the plurality of first spacers 151 have a first height g1 in a direction Z perpendicular to a plane where the first base substrate 1 is located, and the plurality of second spacers 152 have a second height g2 in the direction Z perpendicular to the plane where the first base substrate 1 is located, and the first height g1 is greater than the second height g2. This allows the first spacer 151 to act primarily as a support to provide strength support, and the second spacer 152 to act as an auxiliary support to prevent impacts from pressing and collision.

In some embodiments, the shape of the orthographic projection of the cross-section of the spacer on the first base substrate includes a circle. Additionally, the cross-section is a cross-section at a set plane, and the set plane is parallel to the first base substrate. In some embodiments, the shapes of orthographic projections of the cross-sections of the first spacer 151 and the second spacer 152 on the first base substrate include a circle. For example, as shown in FIG. 10A and FIG. 10B, at a plane S0 parallel to the first base substrate 1, the shape of the cross-section S10 of the first spacer 151 is circular, and the shape of the cross-section S20 of the second spacer 152 is also circular.

Figure 10A:
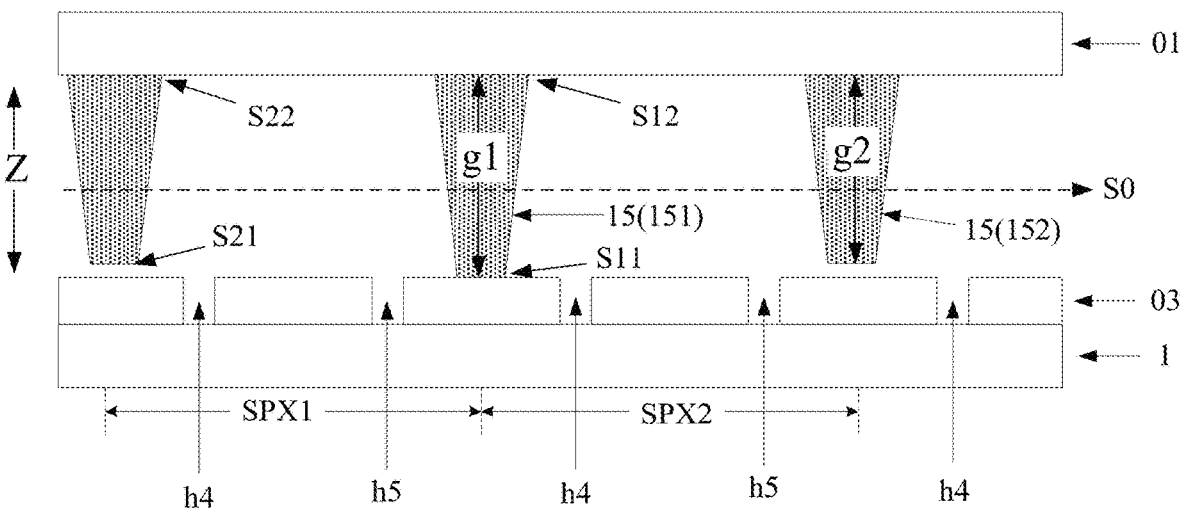
FIG. 10A is a schematic diagram of a cross-sectional structure of a display panel in embodiments of the present disclosure.
Figure 10B:
FIG. 10B is a schematic diagram of a cross-sectional structure of a spacer at a set plane in embodiments of the present disclosure.
Figure 10B:
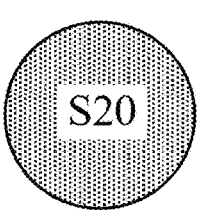
Figure 13:
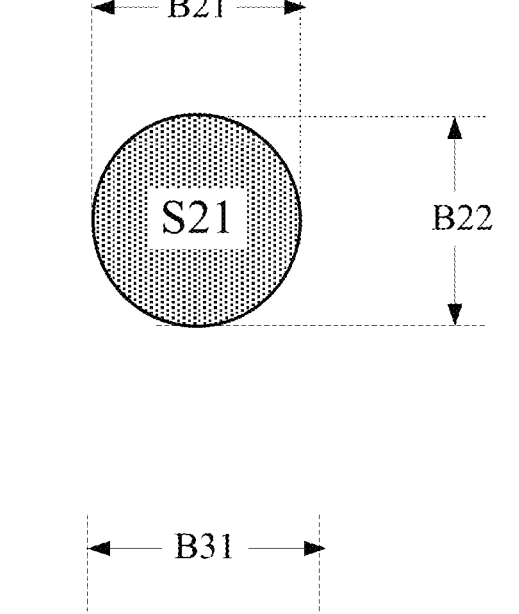
FIG. 13 shows a schematic diagram of some structures of a first surface and a second surface of a spacer in embodiments of the present disclosure.

In some embodiments, as shown in FIGS. 10A and 13, the first spacer 151 has a first surface S11 facing the first base substrate and a second surface S12 facing the second base substrate. In some embodiments, a size of the first surface S11 is smaller than or equal to a size of the second surface S12.

In some embodiments, taking the cross-section of the first spacer 151 being circular, as shown in FIG. 13, the size of the first surface S11 may be set to A21*A22, and the size of the second surface S12 may be set to A31*A32, where A21 and A22 are the diameters in the first surface S11, and A31 and A32 are the diameters in the second surface S12, respectively.

In some embodiments, as shown in FIGS. 10A and 13, the second spacer 152 has a first surface S21 facing the first base substrate and a second surface S22 facing the second base substrate. In some embodiments, taking the cross-section of the second spacer 152 being circular, as shown in FIG. 13, the size of the first surface S21 may be set to B21*B22, and the size of the second surface S22 may be set to B31*B32, where B21 and B22 are diameters in the first surface S21, respectively, and B31 and B32 are diameters in the second surface S22, respectively.

Figure 15:
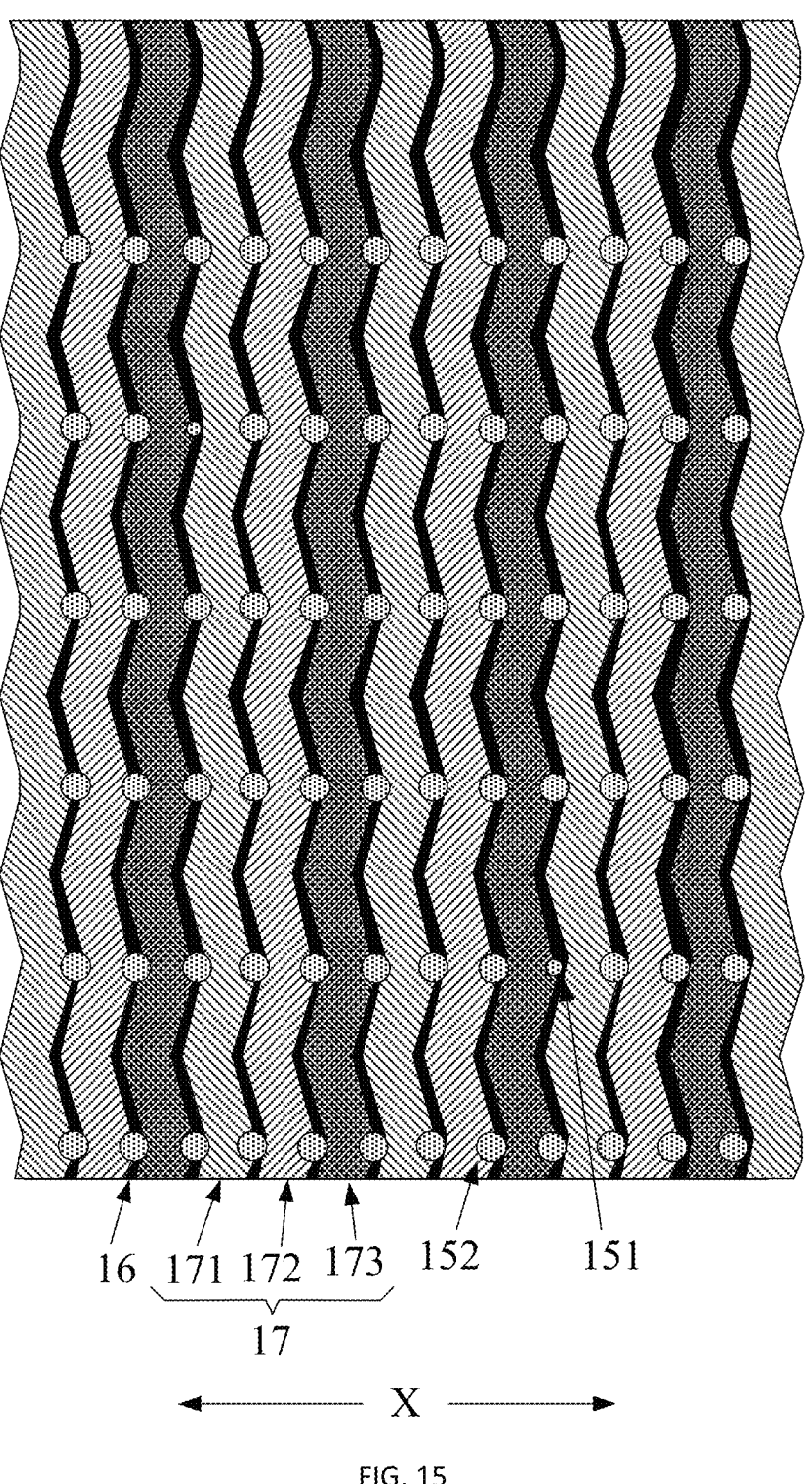
FIG. 15 shows a schematic diagram of yet some other partial specific structures of a display panel in embodiments of the present disclosure.

In some embodiments, the spacers may be periodically arranged so that the first spacers and the second spacers are uniformly distributed within the box, thereby realizing the effect of uniformly supporting the thickness of the box. In some embodiments, as shown in FIG. 15, the plurality of spacers may be divided into a plurality of repeating units; each repeating unit of the plurality of repeating units includes a plurality of first spacers and a plurality of second spacers, and the plurality of first spacers and the plurality of second spacers in the same one repeating unit are uniformly distributed.

In some embodiments, the distribution period of the first spacers 151 in the same one repeating unit is Z1/Zm; where Z1 represents a total number of the first spacers 151 in the repeating unit, and Zm represents a total number of the first spacers 151 and the second spacers 152 in the repeating unit. For example, Zm may be set to 72, and Z1 is set to in a range of 1~5, then the distribution period Z1/Zm of the first spacer 151 may be in a range of 1/72~5/72. For example, the distribution period of the first spacer 151 may be 1/72, or, the distribution period of the first spacer 151 may be 2/72. Of course, the value is only an example, and in practice, the distribution periods may be different in display panels with different application requirements. Therefore, the specific value of Z1/Zm may be determined according to the requirements of the actual application and is not limited herein.

In some embodiments, of the same repeating unit, the distribution period of the second spacer 152 is Z2/Zm; where Z2 represents the total number of the second spacers 152 in the repeating unit. For example, Zm may be set to 72 and Z1 is set to in a range of 1~5, the range of the distribution period Z1/Zm of the second spacer 152 may be 65/72~71/72. For example, the distribution period of the second spacer 152 may be 70/72, or the distribution period of the second spacer 152 may be 68/72. Of course, this value is only an example, and in practice, the display panel with different application requirements may be used in the same repeat unit. Of course, the value is only an example, and in practice, the distribution periods may be different in display panels with different application requirements. Therefore, the specific value of Z2/Zm may be determined according to the requirements of the actual application and is not limited herein.

Figure 11:
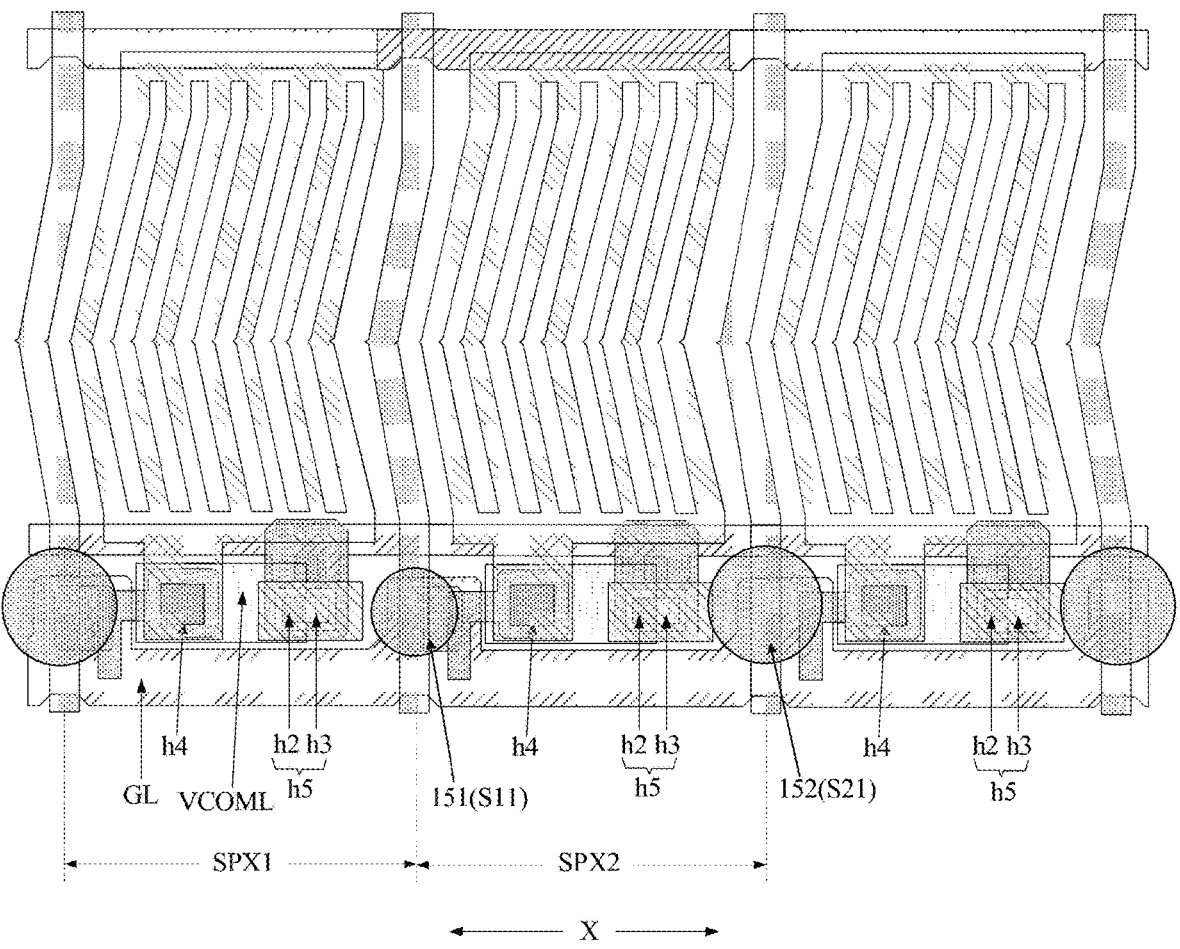
FIG. 11 shows a schematic diagram of some specific structures of a display panel in embodiments of the present disclosure.
Figure 14A:
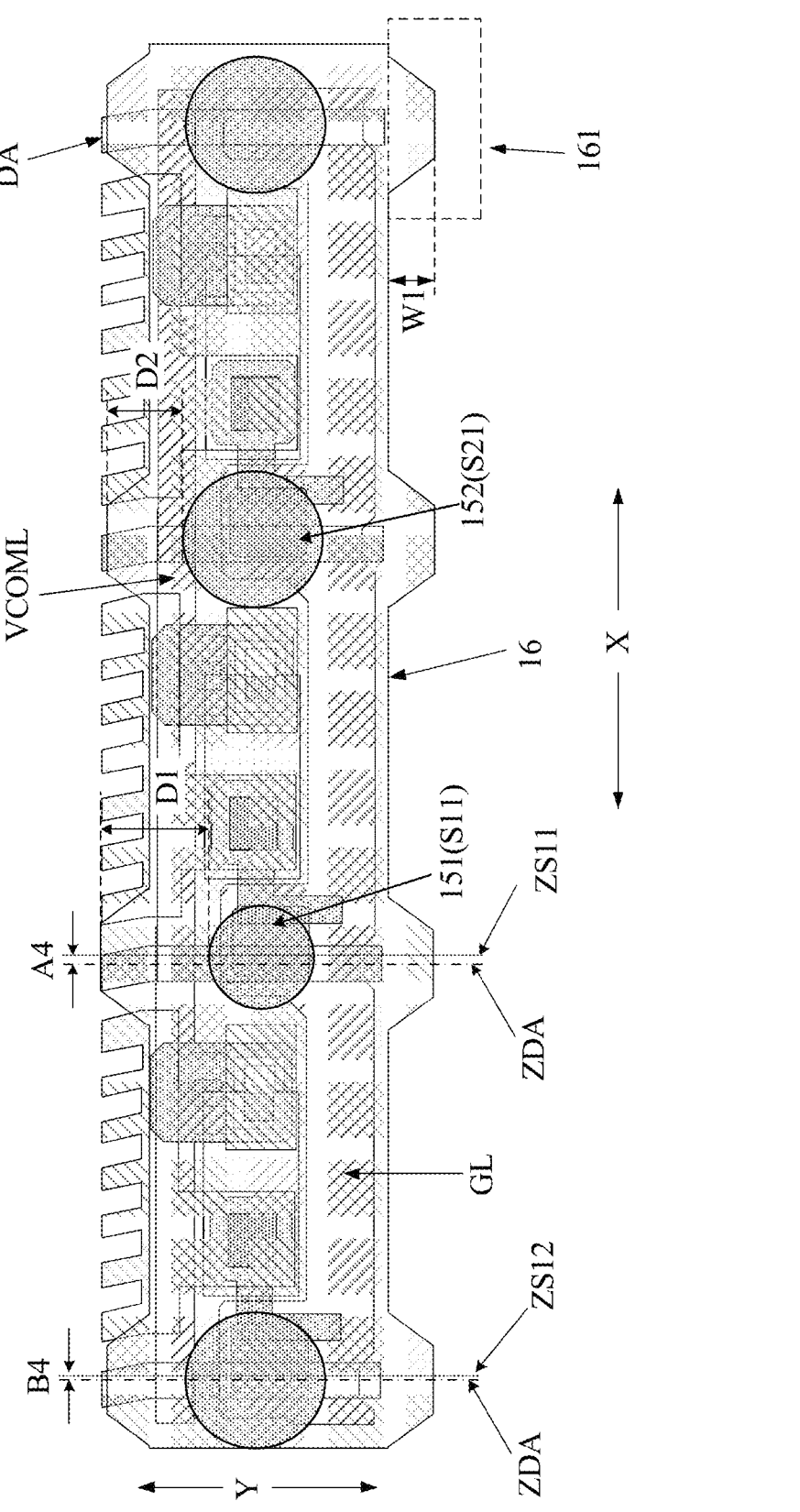
FIG. 14A shows a schematic diagram of some other partial specific structures of a display panel in embodiments of the present disclosure.

In some embodiments, as shown in FIG. 11 and FIG. 14A, the orthographic projection of the spacer on the first base substrate, the orthographic projection of the common electrode via hole corresponding to the first sub-pixel SPX1 on the first base substrate, and the orthographic projection of the pixel via hole corresponding to the second sub-pixel SPX2 on the first base substrate are arranged in the first direction X. The first direction X is the same as the first direction X. For example, the center of the orthographic projection of the spacer on the first base substrate, the center of the orthographic projection of the common electrode via hole corresponding to the first sub-pixel SPX1 on the first base substrate, and the center of the orthographic projection of the pixel via hole corresponding to the second sub-pixel SPX2 on the first base substrate are arranged in a straight line along the first direction X. Of course, due to the factor of process preparation, the centers thereof do not finish being in a straight line, and it is sufficient for the product thereof to approximately satisfy the above relationship.

In some embodiments, the orthographic projection of the first spacer 151 on the first base substrate, the orthographic projection of the common electrode via hole corresponding to the first sub-pixel SPX1 on the first base substrate, and the orthographic projection of the pixel via hole corresponding to the second sub-pixel SPX2 on the first base substrate are arranged in the first direction X. For example, the center of the orthographic projection of the first spacer on the first base substrate, the center of the orthographic projection of the common electrode via hole corresponding to the first sub-pixel SPX1 on the first base substrate, and the center of the orthographic projection of the pixel via hole corresponding to the second sub-pixel SPX2 on the first base substrate are arranged in a straight line along the first direction.

In some embodiments, the orthographic projection of the second spacer 152 on the first base substrate, the orthographic projection of the common electrode via hole corresponding to the first sub-pixel SPX1 on the first base substrate, and the orthographic projection of the pixel via hole corresponding to the second sub-pixel SPX2 on the first base substrate are arranged in the first direction. For example, the center of the orthographic projection of the second spacer 152 on the first base substrate, the center of the orthographic projection of the common electrode via hole corresponding to the first sub-pixel SPX1 on the first base substrate, and the center of the orthographic projection of the pixel via hole corresponding to the second sub-pixel SPX2 on the first base substrate are arranged in a straight line along the first direction.

In some embodiments, a minimum spacing between a boundary of an orthographic projection of a first surface of the spacer on the first base substrate and a boundary of the orthographic projection of the common electrode via hole corresponding to the first sub-pixel SPX1 on the first base substrate is a first distance; and the first surface is a surface of the spacer facing the first base substrate. Additionally, a minimum spacing between the boundary of the orthographic projection of the first surface of the spacer on the first base substrate and a boundary of the orthographic projection of the pixel via hole corresponding to the second sub-pixel SPX2 on the first base substrate is a second distance. A ratio of the first distance to the second distance may be set to range from 0.8 to 1.2. In this manner, the spacer is provided between the common electrode via hole and the pixel via hole that are adjacent to each other, preventing the spacer from falling into the pixel via hole or the common electrode via hole when the spacer is too close to the pixel via hole or the common electrode via hole to affect the support inside the box.

Figure 12:
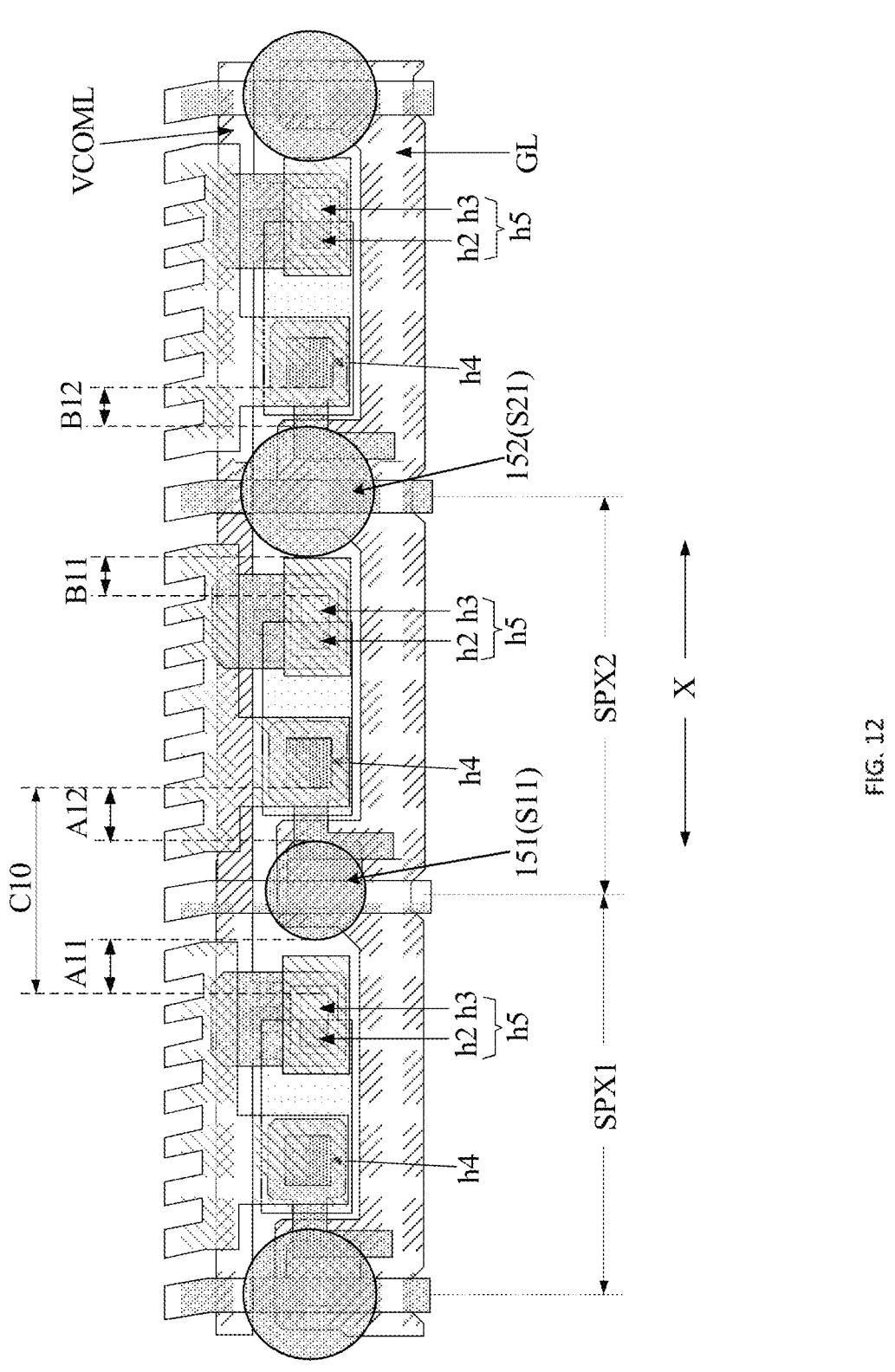
FIG. 12 shows a schematic diagram of some partial specific structures of a display panel in embodiments of the present disclosure.

In some embodiments, as shown in FIGS. 11 and 12, the minimum spacing between the boundary of the orthographic projection of the first surface S11 of the first spacer 151 on the first base substrate and the boundary of the orthographic projection of the common electrode via hole (i.e., the fifth via hole h5) corresponding to the first sub-pixel SPX1 on the first base substrate is a first distance A11. Additionally, the minimum spacing between the boundary of the orthographic projection of the first spacer 151 on the first base substrate and the boundary of the orthographic projection of the pixel via hole corresponding to the second sub-pixel SPX2 (i.e., the fourth via hole h4) on the first base substrate is a second distance A12. A ratio A11/A12 of the first distance A11 to the second distance A12 can be set to be in the range of 0.8 to 1.2. In this manner, the first spacer 151 is provided between the common electrode via hole and the pixel via hole that are adjacent to each other, preventing the first spacer 151 from falling into the pixel via hole or the common electrode via hole when the first spacer 151 is too close to the pixel via hole or the common electrode via hole to affect the support inside the box.

Embodiments of the present disclosure do not limit the specific value of A11/A12. For example, A11/A12 may be 0.8, 0.9, 1.0, 1.1, or 1.2.

In some embodiments, the first distance A11 is greater than or equal to 1.5 um. For example, the first distance A11 is set to 1.5 um, 1.6 um, or 1.7 um, etc.

In some embodiments, the second distance A12 is greater than or equal to 1.5 um. For example, the second distance A12 is set to 1.5 um, 1.6 um, or 1.7 um, etc.

In some embodiments, as shown in FIGS. 11 and 12, the minimum spacing between the boundary of the orthographic projection of the first surface S21 of the second spacer 152 on the first base substrate and the boundary of the orthographic projection of the common electrode via hole (i.e., the fifth via hole h5) corresponding to the first sub-pixel SPX1 on the first base substrate is a first distance B11. Additionally, the minimum spacing between the boundary of the orthographic projection of the second spacer 152 on the first base substrate and the boundary of the orthographic projection of the pixel via hole corresponding to the second sub-pixel SPX2 (i.e., the fourth via hole h4) on the first base substrate is B12. A ratio B11/B12 of the first distance B11 to the second distance B12 can be set to be in the range of 0.8 to 1.2. In this manner, the second spacer 152 is provided between the common electrode via hole and the pixel via hole that are adjacent to each other, preventing the second spacer 152 from falling into the pixel via hole or the common electrode via hole when the second spacer 152 is too close to the pixel via hole or the common electrode via hole to affect the support inside the box.

Embodiments of the present disclosure do not limit the specific values of B11/B12. For example, B11/B12 may be 0.8, 0.9, 1.0, 1.1, or 1.2.

In some embodiments, the first distance B11 is greater than or equal to 1.5 um. For example, the first distance B11 is set to 1.5 um, 1.6 um, or 1.7 um, etc.

In some embodiments, the second distance B12 is greater than or equal to 1.5 um. For example, the second distance B12 is set to 1.5 um, 1.6 um, or 1.7 um, etc.

In some embodiments, a minimum spacing between a boundary of an orthographic projection of a second surface of the spacer on the first base substrate and the boundary of the orthographic projection of the first surface of the spacer on the first base substrate is a third distance. The third distance ranges from 0 to 10 um.

In some embodiments, as shown in FIGS. 12 and 13, the minimum spacing between the boundary of the orthographic projection of the second surface S12 of the first spacer 151 on the first base substrate and the boundary of the orthographic projection of the first surface S11 of the first spacer 151 on the first base substrate is the third distance. The third distance (A31–A21)/2 or (A32–A22)/2 may range from 0 to 10 um. The present disclosure does not limit the specific value of the third distance, for example, it may be 5 um.

In some embodiments, as shown in FIGS. 12 and 13, the minimum spacing between the boundary of the orthographic projection of the second surface S12 of the second spacer 152 on the first base substrate and the boundary of the orthographic projection of the first surface S21 of the second spacer 152 on first base substrate is the third distance. The third distance (B31–B21)/2 or (B32–AB22)/2 may range from 0 to 10 um. The present disclosure does not limit the specific value of the third distance, for example, it may be 5 um.

In some embodiments, as shown in FIG. 14A and FIG. 15, the display panel further includes: a black matrix 16 between the plurality of spacers and the second base substrate. Additionally, an orthographic projection of the black matrix 16 on the first base substrate covers an orthographic projection of each spacer of the plurality of spacers on the first base substrate. Since liquid crystal deflection near the spacers is affected, the black matrix 16 is usually designed at the periphery of the spacers for blocking in order to prevent defects such as optical Mura near the spacers when the display panel is energized.

In some embodiments, the orthographic projection of the black matrix 16 on the first base substrate covers the orthographic projection of each first spacer 151 on the first base substrate to prevent defects such as optical Mura near the first spacer 151 after the display panel is energized.

In some embodiments, the orthographic projection of the black matrix 16 on the first base substrate covers the orthographic projection of each second spacer 152 on the first base substrate to prevent defects such as optical Mura near the second spacer 152 when the display panel is energized.

In some embodiments, the orthographic projection of the black matrix 16 on the first base substrate also covers an orthographic projection of each of the plurality of gate lines on the first base substrate, an orthographic projection of the common voltage line on the first base substrate, and an orthographic projection of the thin-film transistor on the first base substrate to prevent defects such as optical Mura near the gate line, the common voltage line, and the thin-film transistor when the display panel is energized.

In some embodiments, as shown in FIGS. 11 to 14A, an orthographic projection of a part of the plurality of gate lines on the first base substrate has an overlapping region with an orthographic projection of a first surface and a second surface of at least one spacer of the plurality of spacers on the first base substrate. For example, the orthographic projection of a part of the plurality of gate lines on the first base substrate has an overlapping region with the orthographic projection of the first surface and the second surface of each first spacer 151 on the first base substrate. The orthographic projection of a part of the plurality of gate lines on the first base substrate has an overlapping region with the orthographic projection of the first surface and the second surface of each second spacer 152 on the first base substrate.

In some embodiments, as shown in FIGS. 11 to 14A, an orthographic projection of a part of common voltage lines on the first base substrate has an overlapping region with an orthographic projection of the second surface of the at least one spacer of the plurality of spacers on the first base substrate. For example, the orthographic projection of a part of common voltage lines on the first base substrate has an overlapping region with the orthographic projection of the second surface of the first spacer 151 on the first base substrate. For example, the orthographic projection of a part of common voltage lines on the first base substrate has an overlapping region with the orthographic projection of the second surface of the second spacer 152 on the first base substrate.

In some embodiments, as shown in FIGS. 11 to 14A, the orthographic projection of a part of common voltage lines on the first base substrate does not have an overlapping region with an orthographic projection of the first surface of the at least one spacer of the plurality of spacers on the first base substrate. For example, the orthographic projection of a part of common voltage lines on the first base substrate does not have an overlapping region with the orthographic projection of the first surface of the second spacer on the first base substrate. The orthographic projection of a part of common voltage lines on the first base substrate has an overlapping region with the orthographic projection of the second surface of the second spacer on the first base substrate.

In some embodiments, as shown in FIG. 14A, for a spacer and a gate line the orthographic projections of which are overlapped with each other, a black matrix 16 corresponding to the spacer has a convex portion along a second direction, and a width of the convex portion in the second direction is in a range of 5 um to 8 um. For example, for the first spacer 151 and the gate line the orthographic projections of which are overlapped with each other, the black matrix 16 corresponding to the first spacer 151 has a convex portion 161 along the second direction Y, and a width W1 of the convex portion 161 in the second direction Y is in the range of 5 um to 8 um.

The embodiments of the present disclosure do not limit the specific value of the width W1 of the convex portion 161 in the second direction Y. For example, W1 may be set to 5 um, 6 um, 6.25 um, 7 um, or 8 um, etc.

In some embodiments, the orthographic projection of the first surface of the spacer on the first base substrate has an overlapping region with an orthographic projection of a region where the thin film transistor is located on the first base substrate. Additionally, for the spacer and the thin film transistor the orthographic projections of which are overlapped with each other, the orthographic projection of the region where the thin film transistor is located on the first base substrate is located at a lower right side of the orthographic projection of the first surface of the spacer on the first base substrate.

Figure 14B:
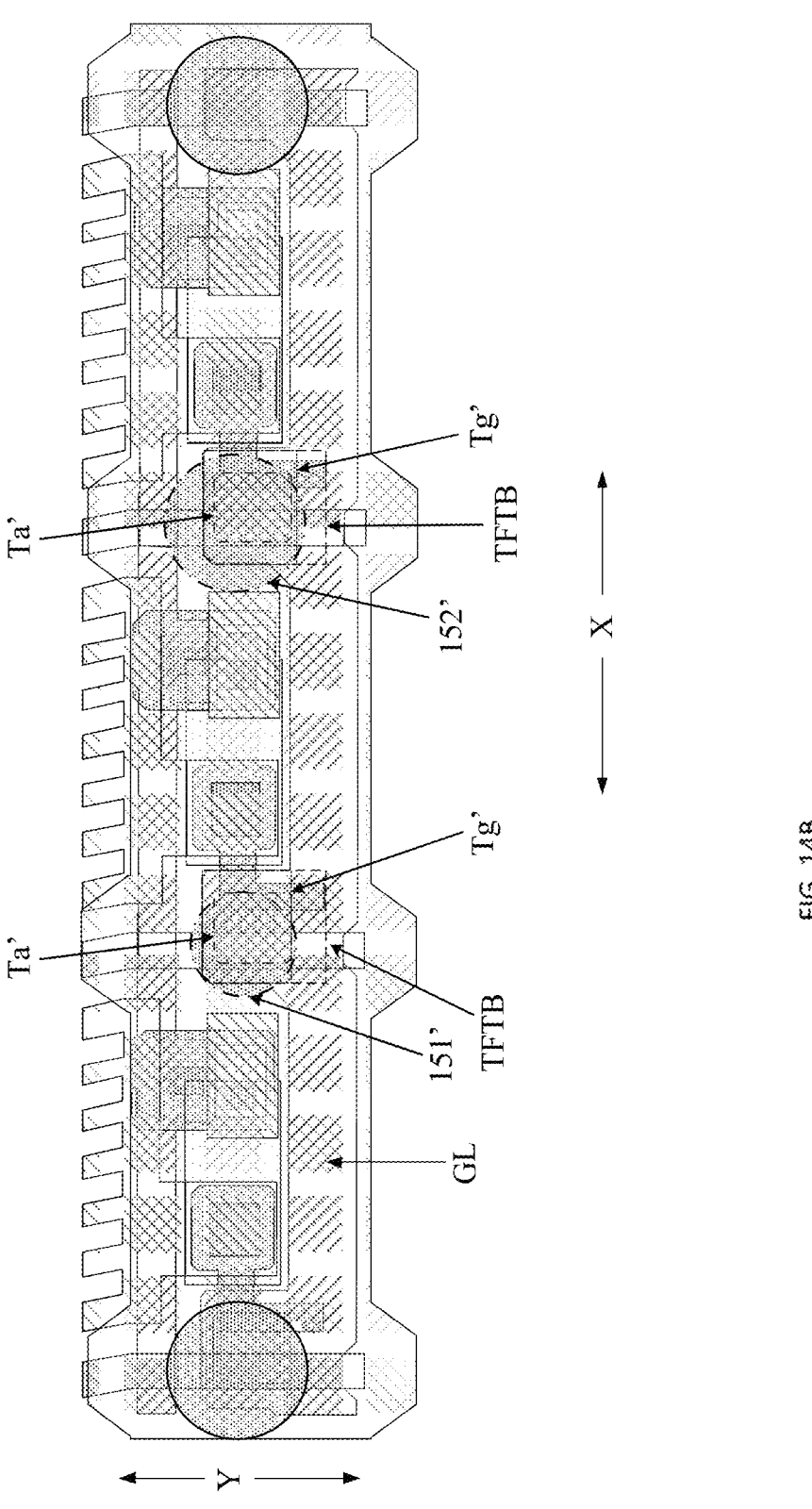
FIG. 14B shows a schematic diagram of yet some other partial specific structures of a display panel in embodiments of the present disclosure.

In some embodiments, in conjunction with FIG. 14A and FIG. 14B, for the first spacer 151, for example, when the first spacer 151 is in the shape of a circular table, that is, the first surface S11 has a circular cross-sectional shape in the direction parallel to the plane where the base substrate is located. The orthographic projection 151' of the first surface S11 of the first spacer 151 on the first base substrate 1 has an overlapping region with the orthographic projection of the region TFTB where the thin-film transistor is located on the first base substrate 1. Additionally, for the first spacer 151 and the thin-film transistor (TFT) the orthographic projections of which are overlapped with each other, the orthographic projection of the region TFTB where the thin-film transistor is located on the first base substrate 1 is located at a lower right side of the orthographic projection of the first surface S11 of the first spacer 151 on the first base substrate 1.

In some embodiments, in conjunction with FIG. 14A and FIG. 14B, for the second spacer 152, for example, when the second spacer 152 is in the shape of a circular table, that is, the first surface S21 has a circular cross-sectional shape in the direction parallel to the plane where the base substrate is located. The orthographic projection 152' of the first surface S21 of the second spacer 152 on the first base substrate 1 has an overlapping region with the orthographic projection of the region TFTB where the thin-film transistor is located on the first base substrate 1. Additionally, for the second spacer 152 and the thin film transistor (TFT) the orthographic projections of which are overlapped with each other, the orthographic projection of the region TFTB where the thin film transistor is located on the first base substrate 1 is located at a lower right side of the orthographic projection of the first surface S21 of the second spacer 152 on the first base substrate 1.

In some embodiments, an area of an orthographic projection of an active layer of the thin film transistor on the first base substrate is an active layer area; an area of the orthographic projection of the first surface of the spacer on the first base substrate is a first surface area; and a ratio of the active layer area to the first surface area ranges from 0.2 to 1.0.

In some embodiments, in conjunction with FIG. 14A and FIG. 14B, for the first spacer 151, for example, the first spacer 151 is in the shape of a circular table, that is, the first surface S11 has a circular cross-sectional shape along the direction parallel to the plane where the base substrate is located. the area of the orthographic projection Ta' of the active layer Ta of the thin-film transistor on the first base substrate 1 is the active layer area MACT, the area of the orthographic projection 151' of the first surface S11 of the first spacer 151 on the first base substrate 1 is the first surface area MS11, and the ratio of the active layer area MACT to the first surface area MS11 of the first spacer 151 (i.e., MACT/MS11) may be in the range of 0.2 to 1.0, that is, MACT/MS11 may range from 0.2 to 1.0. Optionally, the ratio of the active layer area to the first surface area of the first spacer 151 (i.e., MACT/MS11) ranges from 0.25 to 0.7. Further, the ratio of the active layer area to the first surface area of the first spacer 151 (i.e., MACT/MS11) ranges from 0.3 to 0.5. For example, the ratio of the active layer area to the first surface area of the first spacer 151 (i.e., MACT/MS11) may be 0.2, 0.25, 0.3, 0.35, 0.4, 0.5, 0.6, 0.7, 0.8, 0.9, or 1.0.

In some embodiments, in conjunction with FIG. 14A and FIG. 14B, for the second spacer 152, for example, the second spacer 152 is in the shape of a circular table, that is, the first surface S21 has a circular cross-sectional shape along the direction parallel to the plane where the base substrate is located, the area of the orthographic projection Ta' of the active layer Ta of the thin-film transistor on the first base substrate 1 is the active layer area MACT, the area of the orthographic projection 152' of the first surface S21 of the second spacer 152 on the first base substrate 1 is the first surface area MS12, and the ratio of the active layer area MACT to the first surface area MS12 of the second spacer 152 (i.e., MACT/MS12) ranges from 0.2 to 1.0, that is, MACT/MS12 may be range from 0.2 to 1.0. Optionally, the ratio of the active layer area to the first surface area of the second spacer 152 (i.e., MACT/MS12) ranges from 0.25 to 0.7. Further, the ratio of the active layer area to the first surface area of the second spacer 152 (i.e., MACT/MS12) ranges from 0.3 to 0.5. For example, t the ratio of the active layer area to the first surface area of the second spacer 152 (i.e., MACT/MS12) may be 0.2, 0.25, 0.28, 0.3, 0.35, 0.4, 0.5, 0.6, 0.7, 0.8, 0.9, or 1.0.

In some embodiments, the area of the orthographic projection of the first surface of the spacer on the first base substrate is the first surface area; the area of the overlapping region of the orthographic projection of the spacer on the first base substrate and the orthographic projection of the gate electrode of the thin film transistor on the first base substrate is the gate electrode overlapping area; and for the spacer and the gate electrode of the thin film transistor the orthographic projections of which are overlapped with each other, a ratio of the gate electrode overlapping area to the first surface area ranges from 0.2 to 1.0.

In some embodiments, in conjunction with FIG. 14A and FIG. 14B, for the first spacer 151, for example, the first spacer 151 is in the shape of a circular table, that is, the first surface S11 has a circular cross-sectional shape along the direction parallel to the plane where the base substrate is located. The area of the orthographic projection 151' of the first surface S11 of the first spacer 151 on the first base substrate 1 is the first surface area MS11, and the area of the overlapping region of the orthographic projection 151' of the first spacer 151 on the first base substrate and the ortho-graphic projection Tg' of the gate electrode Tg of the thin-film transistor on the first base substrate 1 is the gate electrode overlapping area MTg. For the first spacer 151 and the gate electrode Tg of the thin-film transistor the ortho-graphic projections of which are overlapped with each other, the ratio of the gate electrode overlapping area MTg to the first surface area MS11 (i.e., MTg/MS11) ranges from 0.2 to 1.0. Optionally, the ratio of the gate electrode overlapping area MTg to the first surface area MS11 (i.e., MTg/MS11) ranges from 0.4 to 0.9. Further, the ratio of the gate electrode overlapping area MTg to the first surface area MS11 (i.e. MTg/MS11) ranges from 0.6 to 0.9. For example, the ratio of the gate electrode overlapping area MTg to the first surface area MS11 (i.e., MTg/MS11) is 0.2, 0.3, 0.4, 0.5, 0.6, 0.7, 0.8, 0.84, 0.9, or 1.0.

In some embodiments, in conjunction with FIG. 14A and FIG. 14B, for the second spacer 152, for example, the second spacer 152 in the shape of a circular table, that is, the first surface S21 has a circular cross-sectional shape along the direction parallel to the plane where the base substrate is located. The area of the orthographic projection 152' of the first surface S12 of the second spacer 152 on the first base substrate 1 is the first surface area MS12, and the area of the overlapping region of the orthographic projection 152' of the second spacer 152 on the first base substrate 1 and the orthographic projection Tg' of the gate electrode Tg of the thin-film transistor on the first base substrate 1 is the gate electrode overlapping area MTg. For the second spacer 152 and the gate electrode of the thin-film transistor Tg the orthographic projections of which are overlapped with each other, the ratio of the gate electrode overlapping area MTg to the first surface area MS12 (i.e., MTg/MS12) ranges from 0.2 to 1.0. Optionally, the ratio of the gate electrode over-lapping area MTg to the first surface area MS12 (i.e., MTg/MS12) ranges from 0.4 to 0.9. Further, the ratio of the gate electrode overlapping area MTg to the first surface area MS12 (i.e., MTg/MS12) ranges from 0.6 to 0.9. For example, the ratio of the gate electrode overlapping area MTg to the first surface area MS12 (i.e., MTg/MS12) is 0.2, 0.3, 0.4, 0.5, 0.6, 0.66, 0.7, 0.8, 0.9, or 1.0.

In some embodiments, the orthographic projection of the spacer on the first base substrate has an overlapping region with an orthographic projection of the plurality data lines on the first base substrate; the spacer has a first central axis along a second direction and the data line has a second central axis along the second direction; and for the spacer and the data line the orthographic projections of which are overlapped with each other, a spacing between the first central axis of the spacer and the second central axis of the data line is a fourth distance. The fourth distance is in the range of 0 to 20 um.

In some embodiments, as shown in FIG. 14B, for the first spacer 151, for example, the first spacer 151 is in the shape of a circular table, that is, the first surface S11 has a circular cross-sectional shape along the direction parallel to the plane where the base substrate is located. The first spacer 151 has the first central axis ZS11 along the second direction Y, and the first central axis ZS11 passes through the center of the circle of the first surface S11. The data line DA has the second central axis ZDA along the second direction Y. For the first spacer 151 and the data line DA the orthographic projections of which are overlapped with each other, the spacing between the first central axis ZS11 of the first spacer 151 and the second central axis ZDA of the data line DA is a fourth distance A4. Additionally, the fourth distance A4 ranges from 0 to 20 um. Optionally, the fourth distance A4 ranges from 0 to 10 um. Further, the fourth distance A4 ranges from 0 to 5 um. For example, the fourth distance A4 may be 0, 2 um, 5 um, 8 um, 10 um, 13 um, 15 um, or 17 um. Of course, in practice, the specific value of the fourth distance A4 may be determined according to the needs of the actual application, and is not limited herein.

In some embodiments, as shown in FIG. 14B, for the second spacer 152, for example, the second spacer 152 is in the shape of a circular table, that is, the first surface S21 has a circular cross-sectional shape along the direction parallel to the plane where the base substrate is located. The second spacer 152 has the first central axis ZS12 along the second direction Y, and the first central axis ZS12 passes through the center of the circle of the first surface S21. The data line DA has the second central axis ZDA along the second direction Y. For the second spacer 152 and the data line DA the orthographic projections of which are overlapped with each other, the spacing between the first central axis ZS12 of the second spacer 152 and the second central axis ZDA of the data line DA is a fourth distance B4. Additionally, the fourth distance B4 is in a range of 0-20 um. Optionally, the fourth distance B4 is in a range of 0-10 um. Further, the fourth distance B4 is in a range of 0-5 um. For example, the fourth distance B4 may be 0, 2 um, 5 um, 8 um, 10 um, 13 um, 15 um, or 17 um. Of course, in practice, the specific value of the fourth distance B4 may be determined according to the needs of the actual application, and is not limited herein.

In practice, the sizes of the spacers corresponding to display panels for different application requirements are different. For example, taking a cross-section of a circle as an example, in a Widescreen Ultra extended Graphics Array (WUXGA) display panel, the distance between a common electrode via hole (i.e., the fifth via hole h5) in the first sub-pixel SPX1 and a pixel via hole (i.e., the fourth via hole h4) in the second sub-pixel SPX2 can be set to 26.8 um, and A21 and A22 can be set to 13.5 um, that is, the size (Size) of the first surface S11 can be 13.5 um*13.5 um. A31 and A32 can be set to 23.5 um, that is, the size (Size) of the second surface S12 can be 23.5 um*23.5 um. In the second direction Y, the shortest distance D1 between the boundary of the orthographic projection of the first surface S11 on the first base substrate 1 and the boundary of the orthographic projection of the black matrix covering it on the first base substrate 1 may be 21 um. The first height g1 may be 3.18 um, and the distribution period thereof is 2/72. Additionally, the density $\rho 1$ of the first spacer 151 satisfies the formula: $\rho 1=SA1*ZA1/SP$. Where, SA1 represents the area of the first surface S11 (whose unit may be $um^2$), ZA1 represents the distribution period of the first spacer 151, and SP represents the area of the sub-pixel (whose unit may be $mm^2$). For example, when the first spacer 151 is in the shape of a circular table, that is, the first surface S11 has a circular cross-sectional shape along the direction parallel to the plane where the base substrate is located, $SA1=\pi R^2=3.14*13.5*13.5/4=143$ $um^2$, $\rho 1=\mathcal{E}R^2*ZA1/SP=143*2/72/(59.84*179.52)=369.8$ $um^2/mm^2$. Additionally, B21 and B22 may be set to 21 um, that is, the size (Size) of the second surface S12 may be 21 um*21 um. In the second direction Y, the shortest distance D2 between the boundary of the orthographic projection of the first surface S21 on the first base substrate 1 and the boundary of the orthographic projection of the black matrix covering it on the first base substrate 1 may be 11 um. B31 and B32 may be set to 31 um, that is, the size (Size) of the second surface S22 may be 31 um*31 um, the second height g2 of the second surface S22 is 2.65 um, and the distribution period of the second surface S22 is 68/72. Additionally, the density $\rho 2$ of the second spacer 152 satisfies the formula: $\rho 2=SA2*ZA2/SP$. Where, SA2 represents the area of the second surface S12 (whose unit may be $um^2$), ZA2 represents the distribution period of the second spacer 152, and SP represents the area of the sub-pixel (whose unit may be $mm^2$).

In some embodiments, as shown in FIG. 15, the plurality of sub-pixels include: a first color sub-pixel, a second color sub-pixel, and a third color sub-pixel arranged sequentially along the first direction X. The display panel further includes: a color resistance layer 17 between the black matrix 16 and the plurality of spacers. Where, the color resistance layer 17 includes a first color resistance 171 corresponding to the first color sub-pixel, a color resistance of a second color 172 corresponding to the second color sub-pixel, and a color resistance of a third color 173 corresponding to the third color sub-pixel. Additionally, the plurality of pixel units include two pixel units adjacent to each other along the first direction. The two pixel units include a first pixel unit and a second pixel unit, and an orthographic projection of a first surface of a first spacer 151 on the first base substrate is overlapped with an orthographic projection of the third color resistance 173 corresponding to the third color sub-pixel in the first pixel unit on the first base substrate and an orthographic projection of the first color resistance 171 corresponding to the first color sub-pixel in the second pixel unit on the first base substrate.

For example, the first color sub-pixel may be a red sub-pixel, the second color sub-pixel may be a green sub-pixel, and the third color sub-pixel may be a blue sub-pixel, so that color mixing can be carried out by red, green, and blue to achieve a color display. Of course, in practice, the light emitting colors of the sub-pixels in the pixel unit may be designed and determined according to the actual application environment, and is not limited herein.

In some embodiments, as shown in FIG. 15, since the color resistances corresponding to the blue sub-pixel and the red sub-pixel, when the transmittance rate is slightly changed, have less effect on the display effect, the adverse effect of the spacers on the display can be reduced by setting the first spacers 151 on the color resistances corresponding to the blue sub-pixel and the red sub-pixel that are adjacent to each other. Then, for the first spacer 151, the first sub-pixel may be the third color sub-pixel and the second sub-pixel may be the first color sub-pixel.

Of course, the orthographic projection of the first surface of the first spacer 151 on the first base substrate may be set within the orthographic projection of the third color resistance 173 corresponding to the third color sub-pixel on the first base substrate, without limitation herein.

In some embodiments, as shown in FIG. 15, the orthographic projection of the first surface of the first spacer 151 on the first base substrate has a first overlapping area with the orthographic projection of the third color resistance 173 corresponding to the third color sub-pixel in the first pixel unit on the first base substrate. The orthographic projection of the first surface of the first spacer 151 on the first base substrate has a second overlapping area with the orthographic projection of the first color resistance 171 corresponding to the first color sub-pixel in the second pixel unit on the first base substrate. The first overlap area may be greater than or equal to the second overlap area.

In some embodiments, the first overlapping area may be equal to the second overlapping area, so that the first spacer 151 can be uniformly provided.

In some embodiments, the color resistance corresponding to the blue sub-pixel, when the transmittance rate is changed, has less effect on the display effect than the color resistance corresponding to the red sub-pixel. By making the first overlapping area larger than the second overlapping area, a majority of the first surface of the first spacer 151 can be provided on the color resistance of blue color to avoid the effect of the change in the transmittance rate on the display effect.

In some embodiments, as shown in FIG. 15, for each of a part of the second spacers 152, the orthographic projection of the first surface of the second spacer 152 on the first base substrate is overlapped with the orthographic projection of the third color resistance 173 corresponding to the third color sub-pixel in the first pixel unit on the first base substrate and the orthographic projection of the first color resistance 171 corresponding to the first color sub-pixel in the second pixel unit on the first base substrate. Then, for that part of the second spacers 152, the first sub-pixel is the third color sub-pixel and the second sub-pixel is the first color sub-pixel.

In some embodiments, as shown in FIG. 15, for each of a part of the second spacers 152, the orthographic projection of the first surface of the second spacer 152 on the first base substrate is overlapped with the orthographic projection of the first color resistance 171 corresponding to the first color sub-pixel on the first base substrate and the orthographic projection of the second color resistance 172 corresponding to the second color sub-pixel on the first base substrate in the same pixel unit, and the first color sub-pixel and the second color sub-pixel are in the same one pixel unit. Then, for that part of the second spacers 152, the first sub-pixel is the first color sub-pixel and the second sub-pixel is the second color sub-pixel.

In some embodiments, as shown in FIG. 15, for each of a part of the second spacers 152, the orthographic projection of the first surface of the second spacer 152 on the first base substrate is overlapped with the orthographic projection of the second color resistance 172 corresponding to the second color sub-pixel on the first base substrate and the orthographic projection of the third color resistance 173 corresponding to the third color sub-pixel on the first base substrate, and the second color sub-pixel and the third color sub-pixel are in the same one pixel unit. Then, for that part of the second spacers 152, the first sub-pixel is the second color sub-pixel and the second sub-pixel is the third color sub-pixel.

Figure 16:
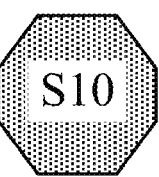
FIG. 16 shows a schematic diagram of yet some other structures of a first surface and a second surface of a spacer in embodiments of the present disclosure.
Figure 16:
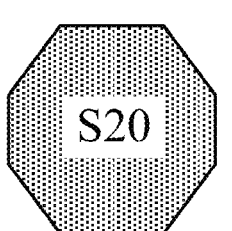
Figure 16:
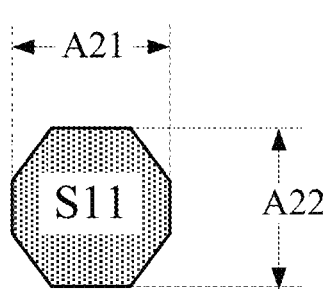
Figure 16:
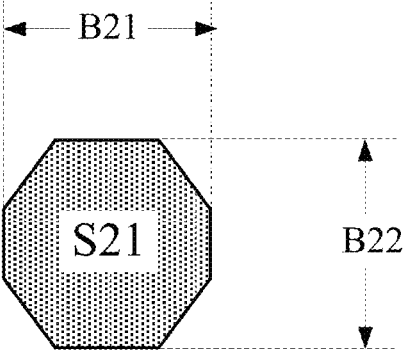
Figure 16:
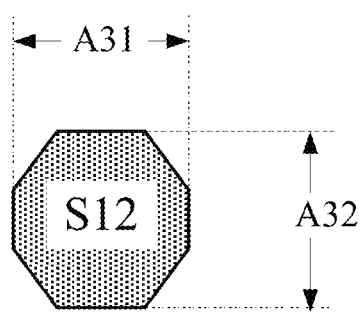
Figure 16:
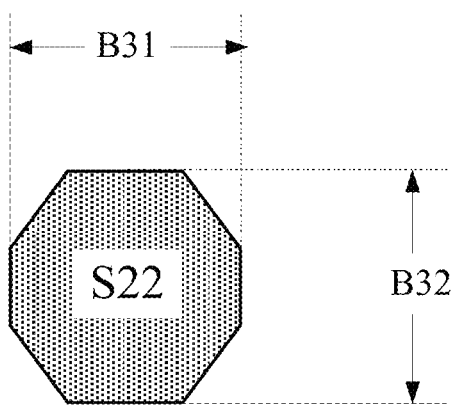

Embodiments of the present disclosure provide a schematic diagram of some other structures of a spacer in the display panel, as shown in FIG. 16, which are deformed with respect to the implementations in the above embodiments. Only the differences between this embodiment and the above embodiments are described below, and the similarities are not repeated herein.

In some embodiments, the shape of the orthographic projection of the cross-section of the spacer on the first base substrate may also include a polygon (e.g., an octagon, a hexagon, etc.). In some embodiments, the polygon may be a regular polygon (e.g., a regular octagon, a regular hexagon, etc.). For example, as shown in FIG. 16, at a plane S0 parallel to the first base substrate 1, the shape of the cross-section S10 of the first spacer 151 is a regular octagon, and the shape of the cross-section S20 of the second spacer 152 is also a regular octagon.

Of course, in practice, the cross-section of the spacer may also be other polygons or polygonal-like shapes, which are not limited herein.

In some embodiments, the shapes of the orthographic projections of the first surface and the second surface of the spacer on the first base substrate include a polygon (e.g., an octagon, a hexagon, etc.). In some embodiments, the polygon may be a regular polygon (e.g., a regular octagon, a regular hexagon, etc.). For example, as shown in FIG. 16, the shape of the first surface S11 of the first spacer 151 is a regular octagon, and the shape of the first surface S21 of the second spacer 152 is also a regular octagon. The shape of the second surface S12 of the first spacer 151 is a regular octagon, and the shape of the second surface S22 of the second spacer 152 is also a regular octagon. Of course, in practice, the cross-section of the spacer may also be other polygons, which is not limited herein.

In some embodiments, taking the cross-section of the first spacer 151 as a circle as an example, as shown in FIG. 16, the size (Size) of the first surface S11 may be set to 2A21*2A22, and the size (Size) of the second surface S12 may be set to 2A31*2A32. Where, A21 and A22 are respectively the radii of the outer circles of the first surface S11 of the shape of the regular octagon, respectively, and A31 and A32 are radii of the outer circles of the second surface S12 the shape of the regular octagon, respectively.

In some embodiments, taking the cross-section of the second spacer 152 is a circle as an example, as shown in FIG. 16, the size (Size) of the first surface S21 may be set to 2B21*2B22, and the size (Size) of the second surface S22 may be set to 2B31*2B32. Where, B21 and B22 are the radii of the outer circles of the first surface S21 of the shape of the regular octagon, respectively, and B31 and B32 are the radii of the outer circles of the first surface S21 of the shape of the regular octagon, respectively.

In practice, the sizes of the spacers corresponding to display panels for different application requirements are different. For example, taking a cross-section of a circle as an example, in a Widescreen Ultra extended Graphics Array (WUXGA) display panel, A21 and A22 may be set to 13.5/2 um, that is, the size (Size) of the first surface S11 may be 13.5 um*13.5 um. A31 and A32 may be set to 23.5/2 um, that is, the size (Size) of the second surface S12 may be 23.5 um*23.5 um. In the second direction Y, the shortest distance between the boundary of the orthographic projection of the first surface S11 on the first base substrate 1 and the boundary of the orthographic projection of the black matrix covering it on the first base substrate 1 is 21 um. The first height g1 is 3.18 um, and the distribution period thereof is 2/72. Additionally, the density ρ1 of the first spacer 151 satisfies the formula: ρ1=SA1*ZA1/SP. Where, SA1 represents the area of the first surface S11 (whose unit may be um$^2$), ZA1 represents the distribution period of the first spacer 151, and SP represents the area of the sub-pixel (whose unit may be mm$^2$). For example, SA1=2$\sqrt{2a1^2}$, and a1 represents the radius of the outer circle of the first surface S11 of the regular octagon. As well, B21 and B22 may be set to 21/2 um, that is, the size (Size) of the second surface S12 may be 21 um*21 um. In the second direction Y, the distance between the boundary of the orthographic projection of the first surface S21 on the first base substrate 1 and the boundary of the orthographic projection of the black matrix covering it on the first base substrate 1 is 11 um. B31 and B32 may be set to 31/2 um, that is, the size (Size) of the second surface S22 may be 31 um*31 um, the second height g2 of the second surface S22 is 2.65 um, and the distribution period of the second surface S22 is 68/72. Additionally, the density ρ2 of the second spacer 152 satisfies the formula: ρ2=SA2*ZA2/SP. Where, SA2 represents the area of the second surface S12 (whose unit may be um$^2$), ZA2 represents the distribution period of the second spacer 152, and SP represents the area of the sub-pixel (whose unit may be mm$^2$). For example, SA2=2$\sqrt{2a2^2}$, and a2 represents the radius of the outer circle of the first surface S21 of the regular octagon.

Figure 17:
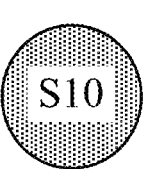
FIG. 17 shows a schematic diagram of yet some other structures of a first surface and a second surface of a spacer in embodiments of the present disclosure.
Figure 17:
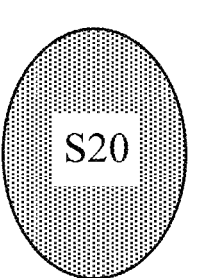
Figure 17:
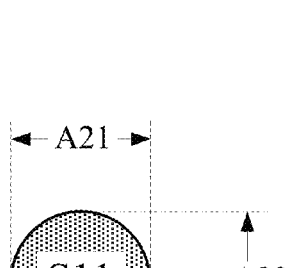
Figure 17:
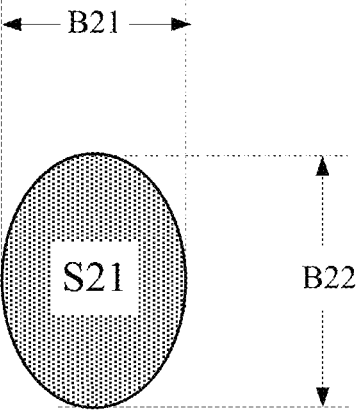
Figure 17:
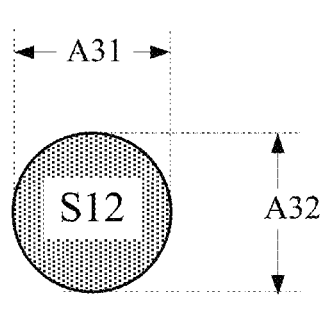
Figure 17:
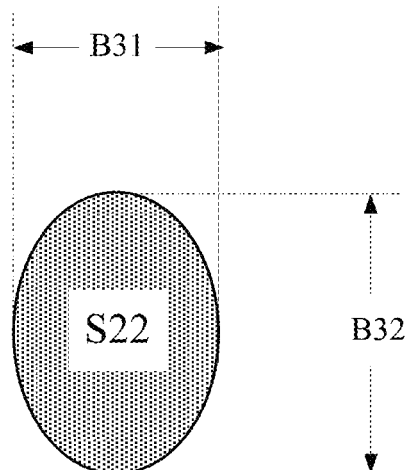

Embodiments of the present disclosure provide a schematic diagram of yet some other structures of a spacer in a display panel, as shown in FIG. 17, which are deformed with respect to the implementations in the above embodiments. Only the differences between this embodiment and the above embodiments are described below, and the similarities will not be repeated herein.

Figure 18:
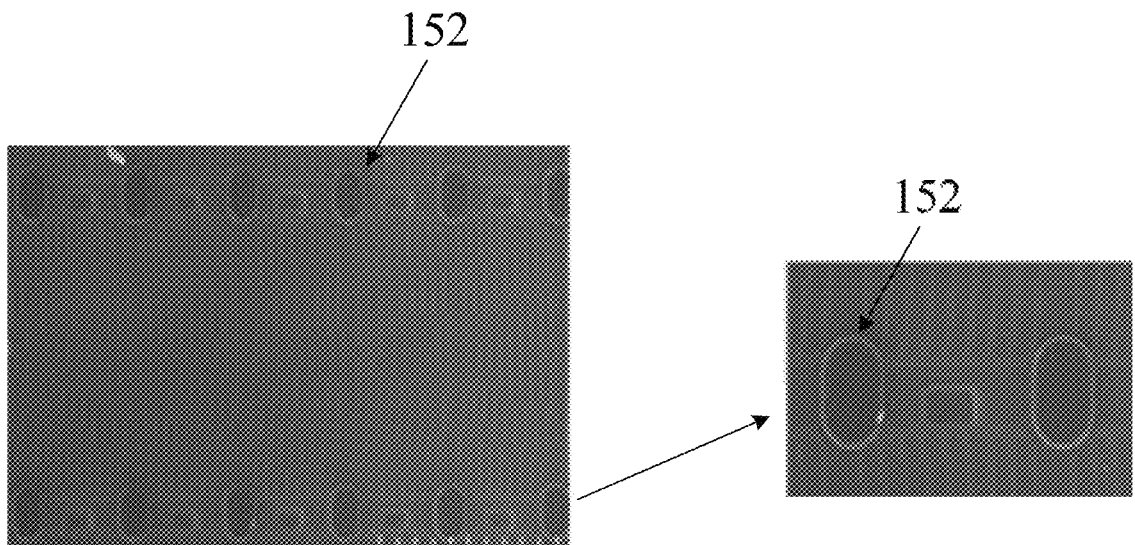
FIG. 18 is a schematic diagram of a top view structure of a display panel obtained by a scanning electron microscopy in embodiments of the present disclosure.
Figure 19:
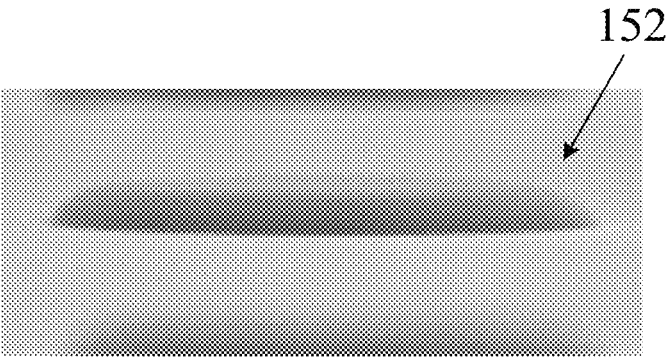
FIG. 19 is a schematic diagram of a cross-sectional structure of a second spacer obtained by a scanning electron microscopy in embodiments of the present disclosure.

In some embodiments, the shape of the orthographic projection of the cross-section of the spacer in the first base substrate includes an ellipse. For example, as shown in FIGS. 17 to 19, at the plane S0 parallel to the first base substrate 1, the shape of the cross-section S20 of the second spacer 152 is also an ellipse. The shape of the cross-section S10 of the first spacer 151 is a circle (or of course an ellipse). But of course, in practice, the cross-section of the spacer may also be other polygons, which are not limited herein.

In some embodiments, the shapes of the orthographic projections of the first surface and the second surface of the spacer on the first base substrate include an ellipse. For example, as shown in FIGS. 17 to 19, the shape of the first surface S11 of the first spacer 151 is an ellipse, and the shape of the first surface S21 of the second spacer 152 is also an ellipse. The shape of the second surface S12 of the first spacer 151 is an ellipse, and the shape of the second surface S22 of the second spacer 152 is also an ellipse. Of course, in practice, the cross-section of the spacer may also be other polygonal shapes, which are not limited herein.

Figure 20:
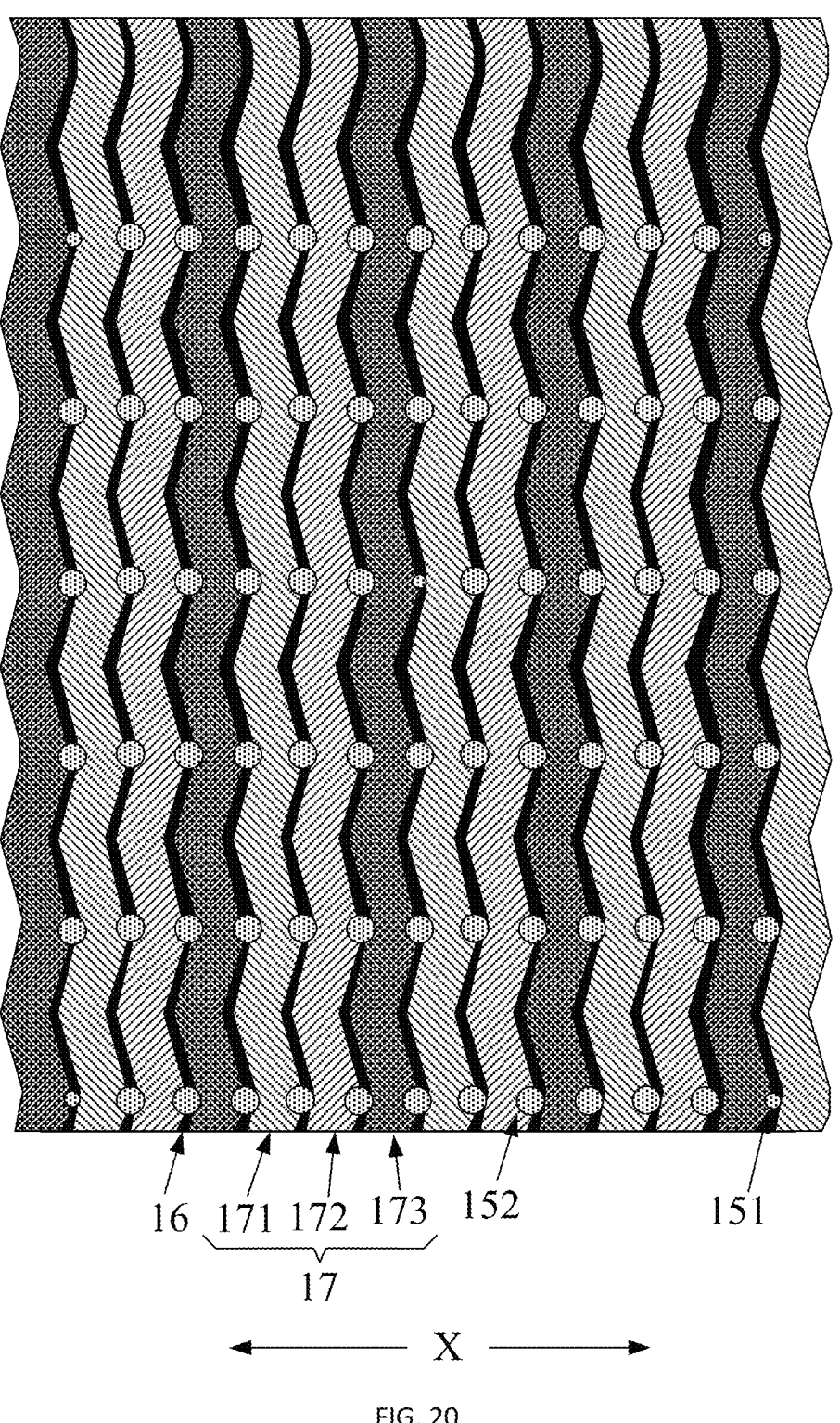
FIG. 20 shows a schematic diagram of yet some other partial specific structures of a display panel in embodiments of the present disclosure.

In practice, the sizes of the spacers corresponding to display panels for different application requirements are different. For example, taking the shape of the cross-section of the first spacer as a circle and the shape of the cross-section of the second spacer as an ellipse as an example, in a quarter high definition (QHD) display panel, as shown in FIGS. 18 to 20, FIG. 18 shows a schematic diagram of a top view structure of a display panel obtained by a scanning electron microscope (SEM), and FIG. 19 is a schematic diagram of a top view structure of the display panel obtained by a SEM.A21 and A22 may be set to 11 um, that is, the size (Size) of the first surface S11 may be 11 um*11 um. A31 and A32 may be set to 21 um, that is, the size (Size) of the second surface S12 may be 21 um*21 um. In the second direction Y, the shortest distance between the boundary of the orthographic projection of the first surface S11 on the first base substrate 1 and the boundary of the orthographic projection of the black matrix covering it on the first base substrate 1 is 21 um. The first height g1 is 2.86 um, and the distribution period thereof is 2/72. Additionally, the density $\rho 1$ of the first spacer 151 satisfies the formula: $\rho 1 = SA1*ZA1/SP$. Where, SA1 represents the area of the first surface S11 (whose unit may be um$^2$), ZA1 represents the distribution period of the first spacer 151, and SP represents the area of the sub-pixel (whose unit may be mm$^2$). For example, $SA1=TR2=3.14\times11\times11/4=95$ um$^2$, and $\rho 1=TR2*ZA1/SP=437.9$ um$^2$/mm$^2$. Additionally, B21 is set to 13 um, and B22 can be set to 18 um, that is, the size (Size) of the second surface S12 can be 13 um*18 um. B31 can be set to 23 um, and B32 can be set to 28 um, that is, the size (Size) of the second surface S22 can be 23 um*28 um. In the second direction Y, the distance between the orthographic projection of the first surface S21 on the first base substrate 1 and the orthographic projection of the black matrix covering it on the first base substrate 1 is 8 um. The second height g2 is 2.36 um, and the distribution period thereof is 68/72. Additionally, the second density $\rho 2$ of the spacer 152 satisfies the formula: $\rho 2 = SA2*ZA2/SP$. Where, SA2 represents the area of the second surface S12 (whose unit may be um$^2$), ZA2 represents the distribution period of the second spacer 152, and SP represents the area of the sub-pixel (whose unit may be mm$^2$).

Embodiments of the present disclosure also provide a display apparatus including the above array substrate provided by the embodiments of the present disclosure. The display apparatus solves the problem in a similar principle as the aforementioned array substrate, so the implementation of the display apparatus can be referred to the implementation of the aforementioned array substrate, and the repetition will not be repeated herein.

In embodiments of the present disclosure, the display apparatus may be: a mobile phone, a tablet computer, a television, a monitor, a laptop computer, a digital photo frame, a navigator, and any other product or component having a display function. Other essential components of the display apparatus should be understood by those of ordinary skill in the art, and are not described herein, nor should they be taken as limitations on the present disclosure.

Although preferred embodiments of the present disclosure have been described, additional changes and modifications may be made to these embodiments once the basic inventive concepts are known to one of skill in the art. Therefore, the appended claims are intended to be construed to include the preferred embodiments as well as all changes and modifications that fall within the scope of the present disclosure.

Obviously, a person skilled in the art can make various modifications and variations to the presently disclosed embodiments without departing from the spirit and scope of the presently disclosed embodiments. Thus, if such modifications and variations of the presently disclosed embodiments fall within the scope of the presently disclosed claims and their technical equivalents, the present disclosure is intended to include such modifications and variations.

What is claimed is:

1. A display panel, comprising:
   a first base substrate, comprising: common voltage lines, a common electrode, a second electrode of a thin film transistor, and a pixel electrode that are located in different film layers;
   wherein the common electrode is electrically connected with one of the common voltage lines through a common electrode via hole, and the pixel electrode is connected with the second electrode of the thin film transistor through a pixel via hole;
   a second base substrate opposite to the first base substrate; and
   a plurality of spacers between the first base substrate and the second base substrate;
   wherein the first base substrate is provided with a plurality of pixel units, each of the plurality of pixel units comprises a plurality of sub-pixels, and each of the plurality of sub-pixels is correspondingly provided with the common electrode via hole and the pixel via hole;
   the plurality of sub-pixels comprise a first sub-pixel and a second sub-pixel adjacent to each other along a first direction;
   wherein, in the first direction, an orthographic projection of at least one spacer of the plurality of spacers on the first base substrate is between an orthographic projection of the common electrode via hole corresponding to the first sub-pixel on the first base substrate and an orthographic projection of the pixel via hole corresponding to the second sub-pixel on the first base substrate;
   wherein an area of an orthographic projection of an active layer of the thin film transistor on the first base substrate is an active layer area;
   an area of an orthographic projection of a first surface of the spacer on the first base substrate is a first surface area; and
   a ratio of the active layer area to the first surface area ranges from 0.2 to 1.0.

2. The display panel according to claim 1, wherein the orthographic projection of the spacer on the first base substrate, the orthographic projection of the common electrode via hole corresponding to the first sub-pixel on the first base substrate, and the orthographic projection of the pixel via hole corresponding to the second sub-pixel that is adjacent to the first sub-pixel on the first base substrate are arranged in the first direction.

3. The display panel according to claim 2, wherein a minimum spacing between a boundary of the orthographic projection of the first surface of the spacer on the first base substrate and a boundary of the orthographic projection of the common electrode via hole corresponding to the first sub-pixel on the first base substrate is a first distance; and the first surface is a surface of the spacer facing the first base substrate;
   a minimum spacing between the boundary of the orthographic projection of the first surface of the spacer on the first base substrate and a boundary of the orthographic projection of the pixel via hole corresponding to the second sub-pixel on the first base substrate is a second distance; and
   a ratio of the first distance to the second distance ranges from 0.8 to 1.2.

4. The display panel according to claim 3, wherein the first distance is greater than or equal to 1.5 um; and/or the second distance is greater than or equal to 1.5 um.

5. The display panel according to claim 3, wherein a minimum spacing between a boundary of an orthographic projection of a second surface of the spacer on the first base substrate and the boundary of the orthographic projection of the first surface of the spacer on the first base substrate is a third distance;

the third distance ranges from 0 to 10 um; and the second surface is a surface of the spacer facing the second base substrate.

6. The display panel according to claim 1, wherein a shape of an orthographic projection of a cross-section of the spacer on the first base substrate comprises: a polygon, a circle, or an ellipse; and the cross-section is a cross-section at a set plane, wherein the set plane is parallel to the first base substrate.

7. The display panel according to claim 1, further comprising: a black matrix between the plurality of spacers and the second base substrate;

wherein an orthographic projection of the black matrix on the first base substrate covers an orthographic projection of each of the plurality of spacers on the first base substrate.

8. The display panel according to claim 7, further comprising: a plurality of gate lines on the first base substrate; a row of sub-pixels is correspondingly provided with one of the plurality of gate lines and one common voltage line;

an orthographic projection of a part of the plurality of gate lines on the first base substrate has an overlapping region with an orthographic projection of the first surface and a second surface of at least one of the plurality of spacers on the first base substrate;

an orthographic projection of a part of the common voltage lines on the first base substrate has an overlapping region with an orthographic projection of the second surface of the at least one of the plurality of spacers on the first base substrate; and the orthographic projection of a part of the common voltage lines on the first base substrate does not have an overlapping region with an orthographic projection of the first surface of the at least one of the plurality of spacers on the first base substrate.

9. The display panel according to claim 8, wherein the orthographic projection of the black matrix on the first base substrate further covers an orthographic projection of each of the plurality of gate lines on the first base substrate, orthographic projections of the common voltage lines on the first base substrate, and an orthographic projection of the thin film transistor on the first base substrate.

10. The display panel according to claim 9, wherein, for a spacer and a gate line the orthographic projections of which are overlapped with each other, a black matrix corresponding to the spacer has a convex portion along a second direction, and a width of the convex portion in the second direction is in a range of 5 um to 8 um.

11. The display panel according to claim 1, wherein the plurality of spacers comprise: a plurality of first spacers and a plurality of second spacers; and the plurality of first spacers have a first height in a direction perpendicular to a plane where the first base substrate is located, and the plurality of second spacers have a second height in the direction perpendicular to the plane where the first base substrate is located, wherein the first height is greater than the second height.

12. The display panel according to claim 11, wherein the plurality of spacers are divided into a plurality of repeating units; wherein each of the plurality of repeating units comprises a plurality of first spacers and a plurality of second spacers, and the plurality of first spacers and the plurality of second spacers in one repeating unit are uniformly distributed;

in the same repeating unit, the plurality of first spacers have a distribution period of $Z1/Zm$; wherein $Z1$ represents a total number of the plurality of first spacers in the repeating unit and $Zm$ represents a total number of the plurality of first spacers and the plurality of second spacers in the repeating unit; and in the same repeating unit, the plurality of second spacers have a distribution period of $Z2/Zm$; wherein $Z2$ represents a total number of the second spacers in the repeating unit.

13. The display panel according to claim 11, wherein the plurality of sub-pixels comprise: a first color sub-pixel, a second color sub-pixel, and a third color sub-pixel arranged sequentially along the first direction;

the display panel further comprises: a color resistance layer between the black matrix and the plurality of spacers; wherein the color resistance layer comprises a first color resistance corresponding to the first color sub-pixel, a second color resistance corresponding to the second color sub-pixel, and a third color resistance corresponding to the third color sub-pixel; and the plurality of pixel units comprise two pixel units adjacent to each other along the first direction, wherein the two pixel units comprise a first pixel unit and a second pixel unit, and an orthographic projection of a first surface of a first spacer on the first base substrate is overlapped with an orthographic projection of the third color resistance corresponding to the third color sub-pixel in the first pixel unit on the first base substrate and an orthographic projection of the first color resistance corresponding to the first color sub-pixel in the second pixel unit on the first base substrate.

14. The display panel according to claim 13, wherein the orthographic projection of the first surface of the first spacer on the first base substrate has a first overlapping area with the orthographic projection of the third color resistance corresponding to the third color sub-pixel in the first pixel unit on the first base substrate; and the orthographic projection of the first surface of the first spacer on the first base substrate has a second overlapping area with the orthographic projection of the first color resistance corresponding to the first color sub-pixel in the second pixel unit on the first base substrate; wherein the first overlapping area is greater than or equal to the second overlapping area.

15. The display panel according to claim 1, wherein the common voltage lines are in the same one layer as a gate electrode of the thin film transistor, the second electrode of the thin film transistor is on a side of the gate electrode of the thin film transistor facing away from the first base substrate, the common electrode is on a side of the second electrode of the thin film transistor facing away from the first base substrate, and the pixel electrode is on a side of the common electrode facing away from the first base substrate;

the display panel further comprises: an insulating layer between the gate electrode of the thin film transistor and the second electrode of the thin film transistor, a planarization layer between the second electrode of the thin film transistor and the common voltage lines, a first passivation layer between the common electrode and the pixel electrode, a first conductive connection electrode that is in the same layer as the pixel electrode, and a second conductive connection electrode that is in the same layer as the second electrode of the thin film transistor;

the second conductive connection electrode is in contact with the common voltage line through a first via hole; wherein the first via hole penetrates the insulating layer; and the first conductive connection electrode is in contact with the second conductive connection electrode through a second via hole, and the first conductive connection electrode is in contact with the common electrode through a third via hole; wherein the common electrode via hole penetrates from a surface of the first passivation layer facing away from the first base substrate to the second conductive connection electrode and the common electrode, and the second via hole is a portion of the common electrode via hole penetrating to the second conductive connection electrode, and the third via hole is a portion of the common electrode via hole penetrating to the common electrode.

16. The display panel according to claim 1, wherein an area of an overlapping region of the orthographic projection of the spacer on the first base substrate and an orthographic projection of a gate electrode of the thin film transistor on the first base substrate is a gate overlapping area; and for the spacer and the gate electrode of the thin film transistor the orthographic projections of which are overlapped with each other, a ratio of the gate overlapping area to the first surface area ranges from 0.2 to 1.0.

17. The display panel according to claim 1, further comprising: a plurality of data lines;

the orthographic projection of the spacer on the first base substrate has an overlapping region with an orthographic projection of the plurality data lines on the first base substrate;

the spacer has a first central axis along a second direction, and the data line has a second central axis along the second direction; and for the spacer and the data line the orthographic projections of which are overlapped with each other, a distance between the first central axis of the spacer and the second central axis of the data line is a fourth distance; wherein the fourth distance is in a range of 0 to 20 um.

18. A display apparatus, comprising: a display panel according to claim 1.

19. The display apparatus according to claim 18, wherein the orthographic projection of the spacer on the first base substrate, the orthographic projection of the common electrode via hole corresponding to the first sub-pixel on the first base substrate, and the orthographic projection of the pixel via hole corresponding to the second sub-pixel that is adjacent to the first sub-pixel on the first base substrate are arranged in the first direction.

20. A display panel, comprising:

a first base substrate, comprising: common voltage lines, a common electrode, a second electrode of a thin film transistor, and a pixel electrode that are located in different film layers; wherein the common electrode is electrically connected with one of the common voltage lines through a common electrode via hole, and the pixel electrode is connected with the second electrode of the thin film transistor through a pixel via hole;

a second base substrate opposite to the first base substrate; and a plurality of spacers between the first base substrate and the second base substrate;

wherein the first base substrate is provided with a plurality of pixel units, each of the plurality of pixel units comprises a plurality of sub-pixels, and each of the plurality of sub-pixels is correspondingly provided with the common electrode via hole and the pixel via hole;

the plurality of sub-pixels comprise a first sub-pixel and a second sub-pixel adjacent to each other along a first direction;

wherein, in the first direction, an orthographic projection of at least one spacer of the plurality of spacers on the first base substrate is between an orthographic projection of the common electrode via hole corresponding to the first sub-pixel on the first base substrate and an orthographic projection of the pixel via hole corresponding to the second sub-pixel on the first base substrate;

the common voltage lines are in the same one layer as a gate electrode of the thin film transistor, the second electrode of the thin film transistor is on a side of the gate electrode of the thin film transistor facing away from the first base substrate, the common electrode is on a side of the second electrode of the thin film transistor facing away from the first base substrate, and the pixel electrode is on a side of the common electrode facing away from the first base substrate;

the display panel further comprises: an insulating layer between the gate electrode of the thin film transistor and the second electrode of the thin film transistor, a planarization layer between the second electrode of the thin film transistor and the common voltage lines, a first passivation layer between the common electrode and the pixel electrode, a first conductive connection electrode that is in the same layer as the pixel electrode, and a second conductive connection electrode that is in the same layer as the second electrode of the thin film transistor;

the second conductive connection electrode is in contact with the common voltage line through a first via hole; wherein the first via hole penetrates the insulating layer; and the first conductive connection electrode is in contact with the second conductive connection electrode through a second via hole, and the first conductive connection electrode is in contact with the common electrode through a third via hole; wherein the common electrode via hole penetrates from a surface of the first passivation layer facing away from the first base substrate to the second conductive connection electrode and the common electrode, and the second via hole is a portion of the common electrode via hole penetrating to the second conductive connection electrode, and the third via hole is a portion of the common electrode via hole penetrating to the common electrode.

* * * * *